Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 1

INVENTORS: J. H. MC GUIGAN
O. J. MURPHY

BY James W. Falk

ATTORNEY

INVENTORS: J. H. McGUIGAN
O. J. MURPHY
BY [signature]
ATTORNEY

INVENTORS: J. H. McGUIGAN
O. J. MURPHY

BY

ATTORNEY

Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 4

INVENTORS: J. H. Mc GUIGAN
O. J. MURPHY

BY

ATTORNEY

INVENTORS: J. H. McGUIGAN
O. J. MURPHY
BY [signature]
ATTORNEY

INVENTORS: J. H. Mc GUIGAN
O. J. MURPHY
BY
ATTORNEY

Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 7

INVENTORS: J. H. McGUIGAN
O. J. MURPHY

BY [signature]

ATTORNEY

INVENTORS: J. H. Mc GUIGAN
O. J. MURPHY
BY
ATTORNEY

MAGNETIC DRUM DIAL PULSE RECORDING AND STORAGE REGISTERS

Filed Sept. 15, 1954 20 Sheets-Sheet 9

INVENTORS: J. H. McGUIGAN
O. J. MURPHY
BY James W. Falk
ATTORNEY

Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 10

INVENTORS: J. H. Mc GUIGAN
O. J. MURPHY
BY [signature]
ATTORNEY

MAGNETIC DRUM DIAL PULSE RECORDING AND STORAGE REGISTERS

INVENTORS: J. H. Mc GUIGAN
O. J. MURPHY
BY [signature]
ATTORNEY

MAGNETIC DRUM DIAL PULSE RECORDING AND STORAGE REGISTERS

Filed Sept. 15, 1954 20 Sheets-Sheet 12

INVENTORS: J. H. MC GUIGAN
O. J. MURPHY
BY
ATTORNEY

Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 13

INVENTORS: J. H. Mc GUIGAN
O. J. MURPHY
BY
ATTORNEY

INVENTORS: J. H. MC GUIGAN
O. J. MURPHY
BY
ATTORNEY

MAGNETIC DRUM DIAL PULSE RECORDING AND STORAGE REGISTERS

Filed Sept. 15, 1954

INVENTORS: J. H. MC GUIGAN
O. J. MURPHY
BY
ATTORNEY

INVENTORS: J. H. MC GUIGAN
O. J. MURPHY
BY
ATTORNEY

INVENTORS: J. H. MC GUIGAN
O. J. MURPHY
BY
ATTORNEY

MAGNETIC DRUM DIAL PULSE RECORDING AND STORAGE REGISTERS

Filed Sept. 15, 1954 20 Sheets-Sheet 18

INVENTORS: J. H. Mc GUIGAN
O. J. MURPHY
BY [signature]
ATTORNEY

Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 19

INVENTORS: J. H. Mc GUIGAN
O. J. MURPHY
BY [signature]
ATTORNEY

Nov. 8, 1955 J. H. McGUIGAN ET AL 2,723,312

MAGNETIC DRUM DIAL PULSE RECORDING AND STORAGE REGISTERS

Filed Sept. 15, 1954 20 Sheets-Sheet 20

INVENTORS: J. H. Mc GUIGAN
O. J. MURPHY
BY [signature]
ATTORNEY

United States Patent Office 2,723,312

Patented Nov. 8, 1955

2,723,312

MAGNETIC DRUM DIAL PULSE RECORDING AND STORAGE REGISTERS

John H. McGuigan, New Providence, N. J., and Orlando J. Murphy, New York, N. Y., assignors to Bell Telephone Laboratories, Incorporated, New York, N. Y., a corporation of New York Application September 15, 1954, Serial No. 456,184

9 Claims. (Cl. 179—16)

This invention relates to the counting, registering, and storing of dial pulses in telephone systems and more particularly to such systems employing magnetic drums.

It has been priorly proposed to employ magnetic drums as memory and storage elements in a telephone system. One such system, wherein connections between calling subscribers are made completely under the control of information permanently and temporarily stored on magnetic drums, is described in an application Serial No. 340,471, filed March 5, 1953, of W. A. Malthaner and H. E. Vaughan, and incorporates certain features of the present invention. In such systems magnetic drums may readily be employed for the temporary storage of dial pulse information identifying the called subscriber. In dial telephone systems, the calling subscriber dials the number of the party to whom he desires to be connected, the number being transmitted to the central office as a train of dial pulses. The central office is unable to act on this information until either all of the pulses representing the digits of the number have been transmitted to it or until specific groups of these pulses have been transmitted, as the pulses for the digits identifying only the exchange of the called party. Accordingly, the dial pulse information must first be registered and stored in the central office before it can be utilized in the setting up of the desired switching connection through the office.

It is a general object of this invention to provide improved magnetic drum circuits for the storage and registration of dial pulse information.

It is another object of this invention to reduce the number of channels required on a magnetic drum for the storage and registration of dial pulse information.

In a specific embodiment of this invention these and other objects are attained by the use, on a cooperative basis, of two magnetic drums, the first, referred to as a line drum, and the second as a register drum. One register drum may jointly cooperate with a number of line drums.

In the subsequent discussion terminology employed in the art will be utilized. Specifically, a cell will refer to the single magnetic spot on which information may be recorded. Each group of cells which pass under a single magnetic reading-writing head as the drum revolves is called a track or channel. And each group of cells along the drum which appears simultaneously under the various head is called a slot.

In accordance with an aspect of this invention the dial pulses of a dialed digit are counted and registered in channels on the line drum, the registration being in coded form and specifically in a binary code. The information written or registered in these channels is therefore a group of magnetic "marks" in a non-decimal code which correspond to the decimal count of the dial pulses for that particular dialed digit. When the pulses of that digit have been counted, the coded information is then transferred to a particular group of channels and a particular group of cells in these channels on the register drum, and the recording space on the line drum, containing the information, cleared to make ready for the next dialed-digit count from that subscriber. Specifically, each digit in the called number is always transferred to the same "address" or time-slot on the register drum, the groups of "cells" constituting the slot accordingly being identified as the first, second, third, etc., digit storage groups. Once these digits, in coded form, have been transferred from the single group of channels on the line drum to the particular group of channels on the register drum to which they apply, they are not again moved or transferred, but remain in these channels until utilized in the setting up of the talking path through the central office.

Accordingly, in accordance with an aspect of this invention, each individual subscriber is actually provided only with sufficient memory capacity on the line magnetic drum to recognize and accumulate one digit of the dialed number. However, as no more than a small fraction of the subscribers connected to a central office will be engaged in placing calls at any one time and an even smaller number will be actually dialing at any given moment, a considerable saving in magnetic drum memory capacity is attained by thus providing only one digit storage channel per subscriber on the line drum and a group of digit storage channels on a register drum to be shared by all the subscribers on not just one but several line drums.

It is a feature of this invention that the dial pulses of the dialed digit be counted and written, as marks, in a group of channels on a first magnetic drum, the coded information marks then being read out and transferred to a group of channels on a second magnetic drum.

It is a further feature of this invention that coded information marks for each dialed digit be transferred from the group of channels on the first drum to specific channels on the second drum, the first digit being registered in a first group of digit storage channels on the register drum at an address or position around the circumference of the register drum selected at random, within limits, from available unused positions and the second digit in a second group of digit storage channels, at the same address as that used for the first group, etc.

It is a still further feature of this invention that there be a plurality of first or line magnetic drums on which the dial pulses of the dialed digits are counted, in coded form, and initially written and a single second or register drum on which the coded information corresponding to the decimal count of the dialed digits accumulated on the various line drums are registered and stored in preassigned sections of preassigned channels.

A complete understanding of this invention and of these and various other features thereof may be gained from consideration of the following detailed description and the accompanying drawing, in which.

Figure 24A:
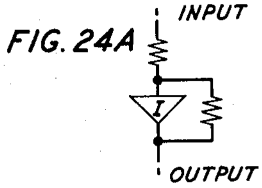
Figure 24B:
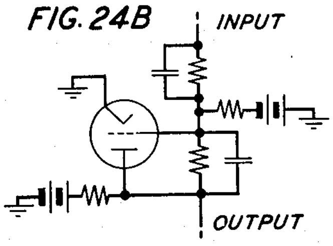

Fgs. 23A and 23B are the block diagram and one illustrative circuit embodiment of a writing amplifier gate circuit employable in the specific embodiment of this invention disclosed; and Figs. 24A and 24B are the block diagram and one illustrative circuit embodiment of an inverter circuit employable in the specific embodiment of this invention dsclosed.

Referring now to the drawing, the coding and registration of dial pulses in accordance with our invention will first be described with reference to the specific embodiment depicted in Fig. 1, which is a block diagram representation of the basic elements of this specific embodiment; a schematic representation of the various elements in the circuit is described in detail below with reference to Figs. 2 through 19. In this embodiment there are ten line drums 20, of which only two are shown and for which the associated circuitry of only one is depicted. The output circuits of these ten line drums are connected through gates in a selector gate circuit 21 to the input circuits of a single register drum 22. In this specific embodiment of the invention the recording positions around the periphery of the register drum are divided into ten groups, each group comprising one-tenth of the circumference, and each of the line drums has access to one and only one of those groups.

When a subscriber desires to place a call he removes his handset from the cradle and merely begins dialing. As he is permanently assigned a slot on the line drum 20 to which he is connected, by the capacity scanner 26, he need not wait for any dial tone but can commence dialing immediately. The closures and opens of the line are detected by the line scanner 26, which may be of the capacitive type described in application Serial No. 282,374, filed April 15, 1952, Patent 2,675,427, issued April 13, 1954, and Patent 2,679,551, issued May 25, 1954, all of N. D. Newby. The capacitive scanner may have its search head or plate mounted on the same shaft as the magnetic line drum and thus each slot on the surface of the line drum 20 is assigned to that line which is being scanned when that slot is under the reading-writing heads of the drum.

In the subsequent description, the operation of this embodiment of the invention will be set forth with respect to a number dialed by one subscriber. The operation of the circuit will proceed at a step-by-step rate not faster than once per drum revolution. It is to be understood that simultaneous with the operation of the circuit in handling the counting, registering, and storing of the dialed digits from this one subscriber, there will be many other subscriber calls being handled on a completely independent basis. Thus at any one time or during any drum revolution there will be a number of independent operations of the circuit on different calls.

The initial pulse when the subscriber lifts his receiver off the hook is applied through a scanner amplifier 28, which may be of the type depicted in Patent 2,691,729, issued October 12, 1954, of W. A. Cornell. This causes a mark to be placed in a control channel of this slot under control of the control and pulse recognition circuit 29. When a dial pulse occurs, there is no signal from the scanner amplifier 28 as dialing comprises opening the subscriber line. The control circuits 29 recognize this and cause a mark to be placed in a cell in the latest digit accumulator channels on the drum, under control of the dial pulse counting and steering circuits 31. These latter circuits act to count the dial pulses and to steer the signals received from the control circuits 29 so that after the digit has been dialed by the subscriber the digit in coded form has been counted and registered in the latest digit accumulator channels. The digit is then read out and temporarily stored in toggle registers 33, the fact that a dialed digit has been accumulated being recognized by an interdigit timing circuit 35, which may advantageously be of the type disclosed in application Serial No. 340,472, filed March 5, 1953 of W. A. Malthaner.

When first the digit is read out into the toggles, it is also erased from the slot on line drum 20. At the same time a Not First Digit mark is recorded in the subscriber's slot on line drum 20. This mark serves to indicate that subsequent digits dialed by the subscriber are not the first digit of the call and must be handled differently.

Each line drum is advantageously provided with two equipment number count channels. One of these channels has a single mark permanently placed in it to indicate the commencement of a count of the slots, and therefore of the lines, assigned to that drum. The other channel has a mark in the cell of each other slot. Thus each slot, and therefore each line, has a numerical designation in terms of the number of slots it is removed from the commencement of the count. This counting is accomplished by a counter and toggle register circuit 36.

When the first digit is spilt into the toggle registers 33, the equipment number count of the line is spilt into toggle registers 36 at the same time. When these items of information are on hand, the gate circuits 40 search for a vacant slot on register drum 22 in the sector assigned to the line drum under consideration. When a vacant slot is found, the equipment number count and the first dialed digit are written on the register drum 22 and the toggle registers are cleared. The chosen slot in drum 22 is now assigned, for the duration of the call, to the subscriber's line indicated by the equipment number count. As the writing of the equipment number is only to occur when the first digit is being transferred from the line drum to the register drum a gate 37 is positioned between the counter 36 and the equipment number channels on the register drum, the gate being disabled when a mark is present in the Not First Digit cell of the slot under consideration on the line drum.

Both the toggle registers 33 and the toggle registers of the counter circuit 36 are enabled by a pulse from a sequence step channel on the register drum in this specific illustrative embodiment of our invention. As described above, each of the ten line drums 20 only has access to one-tenth of the slots on the register drum 22; the sequence step channel on drum 22 and a selector circuit 38 serve to give the toggle registers 33 and 36 associated with a particular line drum 22 access to the register drum 22 only when the slots assigned to that drum on the register drum 22 are available to it.

Thus when the first digit has been registered in the toggles 33 and the appropriate equipment number registered in the counter toggles 36, the equipment number can be registered in vacant equipment-number cells of a slot on the register drum and the first digit passed through a gate circuit 40 and simultaneously written in the first-digit storage cells of that same slot on the register drum 22. The fact that this is the first digit, and that therefore there is no mark stored in the Not First Digit channel on the line drum 20, is utilized also to operate the gate circuit 40. This gate circuit comprises successively activated digit storage gate circuits and amplifiers for the successive registering of the first and subsequent dialed digits in the appropriate digit storage channels on the register drum, as described below.

After the first digit has been stored on the register drum, the second digit is counted, in coded form, and placed in the latest digit accumulator channels on the line drum 20, as described above. Now, however, when the interdigital timing circuit indicates the end of the digit and causes the number stored to be spilled over to the toggle registers 33, the equipment number count read from the count channels on the line drum 20 and stored in the toggle registers 36 is compared with the various equipment number counts in the channels on the register drum 22. When the particular equipment-number count representing this subscriber comes by during the course of the register drum movement through the assigned sector, a match is indicated by match circuit 42. When the match is found, the gate circuits 40 are activated and the information concerning the second digit from this subscriber is read from the toggle registers 33 and steered by the circuits 40 to the second digit storage channels and into the same slot on the register drum 22 in which the first digit information was stored in first digit position. As before, both the toggle registers 33 and 36 are only given access to the drum 22 by a sequence step pulse when the sector of the register drum 22 assigned to the particular line drum is available.

This process is continued until each of the dialed digits in coded form has been steered by the gate circuits 40 to the proper storage destination on the register drum 22. The full designation of the called subscriber is then available on the register drum and may be non-destructively read out and utilized for setting up a connection through a switching network in the telephone office. Reference is made to application Serial No. 340,471, filed March 5, 1953, of W. A. Malthaner and H. E. Vaughan for a disclosure of one such telephone switching system wherein a switching network is controlled by information stored on magnetic drums. The present invention, however, is not directed to a telephone switching system to be controlled but only to the control element and its processes, that is to say the coding of dialed digits and the storage of the dialed digits on a register drum.

Advantageously, there is a hang-up timer channel or channels on the line drum 22 to recognize the fact that the stored information is no longer needed and may be removed from the drums. This hang-up timer may also be of the type disclosed in application Serial No. 340,472, filed March 5, 1953, of W. A. Malthaner.

Turning now to Figs. 2 through 19, there is depicted a detailed schematic representation of one specific embodiment of a line drum and associated dial pulse coding circuits in accordance with our invention as described above with reference to Fig. 1. As seen in Fig. 8, on each revolution of the line drum 20 a single counter reset pulse CRS is provided by a reading head 45, amplifier 44 and pulse-shaping amplifier 61. A pulse C is provided by a reading head 46 and amplifier 47 for each slot on the drum 22, also seen in Fig. 8. The two channels associated with heads 45 and 46 are the equipment number count channels, and will be referred to again below. The pulse C is a timing pulse which is applied to a tetrode 41, seen in Fig. 5, which in turn generates a cell defining pulse CD which is used as a write synchronizing pulse for the various writing operations. The requirement for writing is enablement of the logic gate in the writing amplifier and presence of the CD pulse at the cathode of the trigger tube of the amplifier. Since this latter occurs for every slot, only the conditions at the logic gate will be considered in the following explanations of operation.

Initially all other channels are vacant, any prior information stored therein having been erased. On the drawing at the base of each writing amplifier are positioned a "*w*" and an "*e*," indicating the write and erase leads to the logic gates of the writing amplifier; in each case the "*w*" is on the left and the "*e*" is on the right. The writing and reading amplifiers themselves may be of the types disclosed in Patent 2,700,148, issued January 18, 1955, of J. H. McGuigan, O. J. Murphy, and N. D. Newby, and application Serial No. 393,388, filed November 20, 1953, of J. H. McGuigan and H. E. Vaughan.

Figure 2:
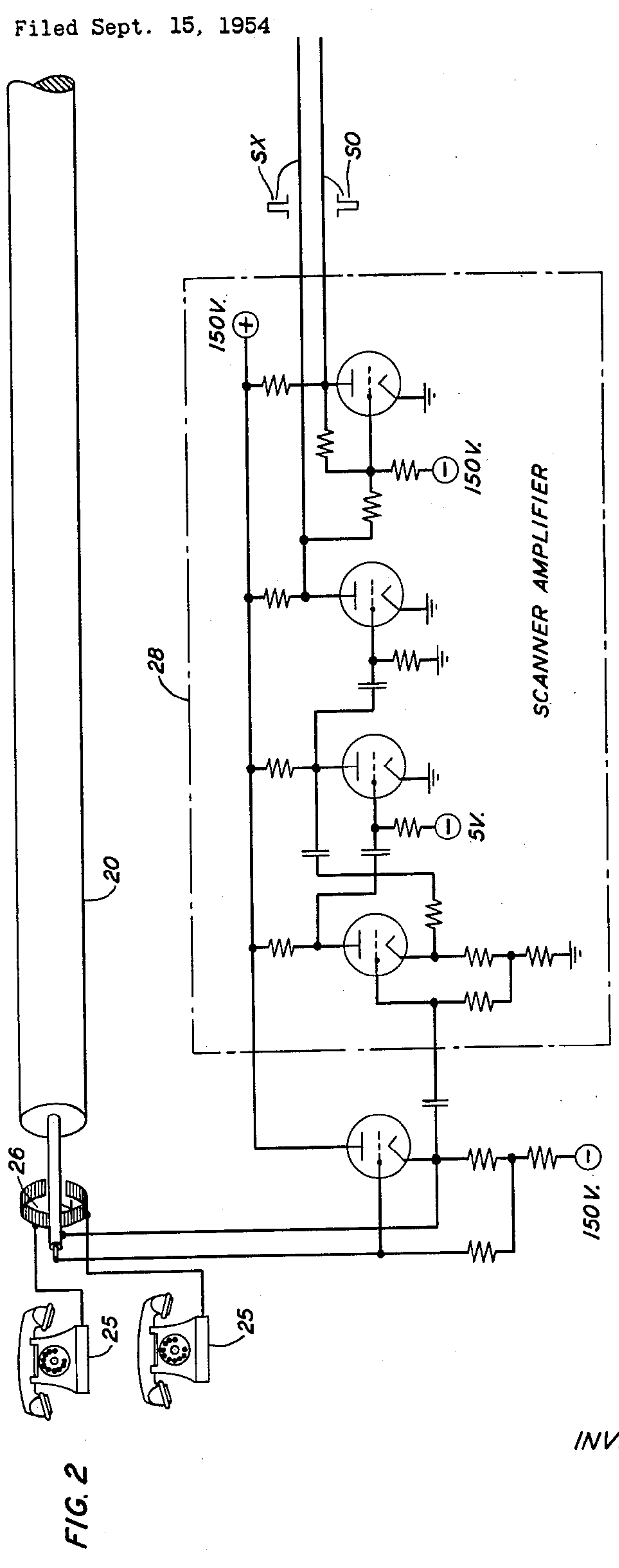
Figs. 2 through 8 are a schematic representation of one specific illustrative embodiment of line drum circuitry employable in the embodiment depicted in Fig. 1, the figures being arranged as shown in the key diagram of Fig. 25.
Figure 25:
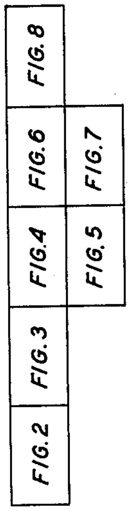
Figure 26:
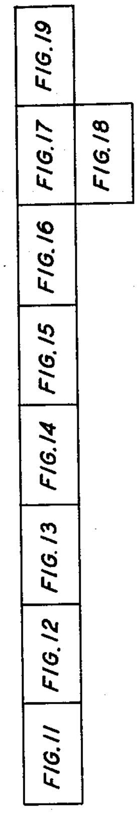

When the subscriber removes his telephone from its cradle the scanner when it next passes the segment to which he is permanently connected will cause its amplifier 28 to produce and transmit a positive pulse SX and a negative pulse SO, as seen in Fig. 2, to the control and pulse recognition circuits 20. Specifically, turning to Fig. 3, the occurrence of the SX pulse causes a mark to be written by the writing amplifier circuit 48 in the A1 control channel, and this mark appears there on the next and subsequent revolutions of the drum. This pattern of a pulse SX and a mark in the channel A1 persists until the first dial pulse, when pulses SX and SO disappear, the voltage on the lead SO going positive. The presence of a mark read from the A1 channel and a positive voltage on the SO lead enables AND gate 49 causing a mark to be written in the A2 channel.

At the end of the individual dial pulse being described, the scanner pulse SX reappears and the presence of the scanner pulse SX and marks in the A1 and A2 channels enable an AND gate 50 causing a mark to be written in the B1 channel of the latest digit accumulator channels and also causing the mark in the A2 channel to be erased. As the output of the reading amplifier is assumed to be a negative pulse, inverters 54 are utilized between the reading amplifiers and the various positive AND gates 49, 50, 51, 52, and 53, described below. The equipment just described constitutes the Control and Pulse Recognition circuits designated as 29 in Fig. 1.

Figure 1:
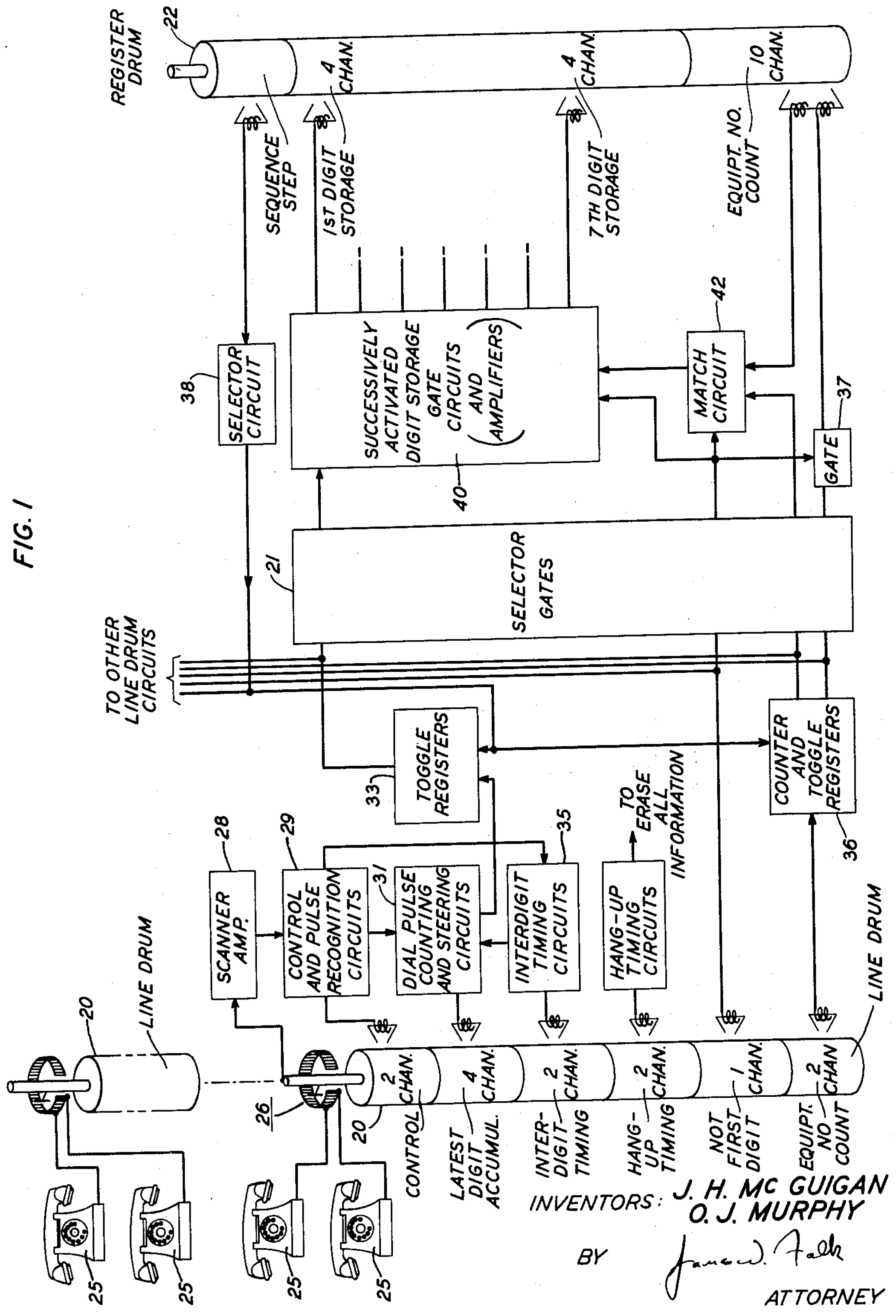
Fig. 1 is a block diagram representation of one specific illustrative embodiment of this invention.
Figure 3:
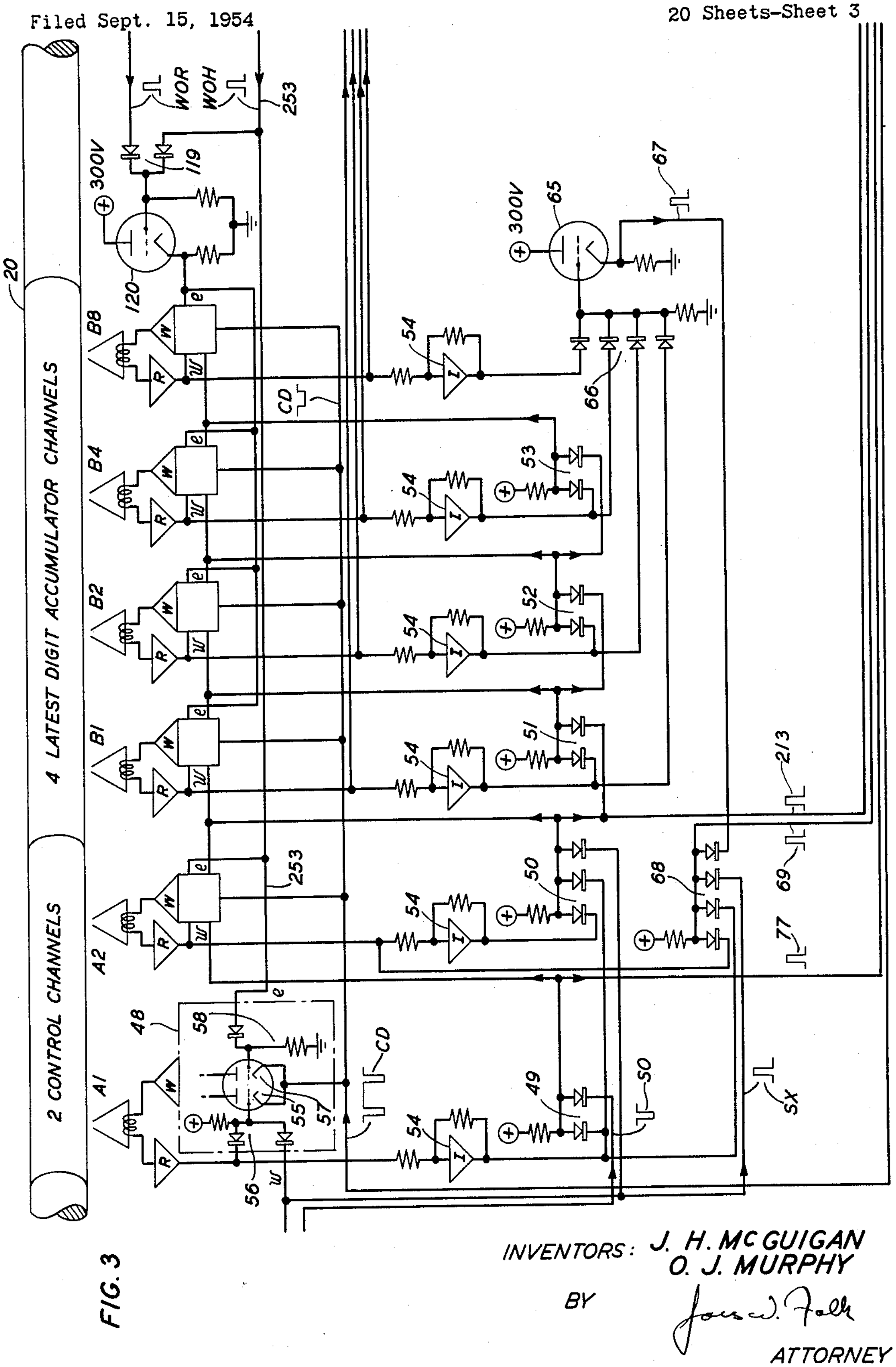
Figure 23A:
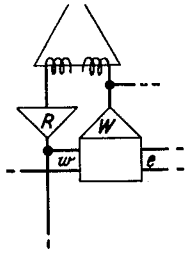
Figure 23B:
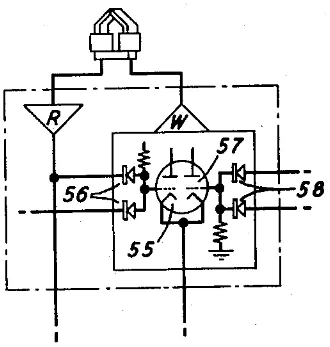

Each succeeding dial pulse is recognized by the pulse recognition circuits 29, of Fig. 1, in the same way, but the pulses are steered between the various latest digit accumulator channels B by the Dial Pulse Counting and Steering circuits 31, as seen in Fig. 1, in accordance with an aspect of this invention so that the dial pulse count is present in the latest digit accumulator channels in coded form. These steering circuits 31 of Fig. 1 include the positive AND gates 51, 52, and 53, seen in Fig. 3, and the writing logic gates associated with the writing amplifiers. As seen in Fig. 3 and specifically in Fig. 23, the input to each write triode section 55 in a logic circuit in the form of an AND gate comprising diodes 56, one control of which is from the output of the reading amplifier associated with the writing head; thus one control for writing in a cell is that there is nothing read from it and hence that there has been priorly nothing written there. Similarly, there is associated with the erase triode section 57 a logic circuit but this circuit takes the form of an OR circuit comprising the pair of diodes 58.

The operation of this circuit in coding the dial pulses can now be described in detail. It proceeds on an additive binary basis. In Fig. 3, when the gate 50 is first enabled, a mark is written in the B1 channel, as described above. Upon the completion of the next dial pulse by our subscriber, the scanner pulse, which had temporarily disappeared, will reappear and will thereby again enable gate 50. However, now as there is already a mark in channel B1, the writing logic gate, including the diodes 56, is not enabled because a negative pulse is applied to the gate from the reading amplifier of the B1 channel. Gate 51, however, is enabled as its controls are a mark in the B1 channel, applied to it through inverter 54, and a pulse from gate 50. Accordingly, a pulse is applied to the writing logic gate of the B2 writing amplifier and a mark placed in the B2 channel for the second of the dialed pulses. At the same time the pulse from gate 51 is applied to the erase logic gate of the writing amplifier of the B1 channel and the mark priorly present in that channel is erased. The result now is nothing in B1, a mark in B2 and nothing yet in B4 and B8. On an additive binary basis, this corresponds to a count of two.

When the third dial pulse is recognized by the control channels, a mark is again placed in the B1 channel by the output of the gate 50. We now have a count of one plus two equals three. When the fourth dial pulse is recognized, the gate 51 is again enabled, as there is a mark in the B1 channel and the gate 52 is also enabled, as there is now a mark in the B2 channel as well as an output from gate 51. Accordingly, a mark is written in the B4 channel and the marks priorly written in the B1 and B2 channels are erased.

This operation continues, if more dial pulses in a continuous train continue to come in, until marks have been placed in the B1, B2, and B4 channels. On the next pulse the gate 53 is enabled by a pulse from the gate 52 and from the inverter 54 associated with the reading amplifier of the B4 channel. Enablement of gate 53 causes a mark to be written in the B8 channel and the mark priorly writte in the B4 channel to be erased. At the same time the gates 51 and 52 are enabled causing erasure of the marks priorly present in the B1 and B2 channels. As these marks had priorly been present nothing is written in these channels.

The final maximum count, that of the tenth dial pulse, occurs when marks have thus been placed in the B8, and B2 channels only.

Thus, as has been described, the pulses from the scanner are steered to the various channels of the latest digit accumulator channels in accordance with a binary code. In accordance with this aspect of our invention, there is considerable saving in channels on the line drums by storing the dialed digit in coded form, rather than merely by counting the number of pulses in successive channels. The logic for writing in a B channel is that there be nothing written in the channel and something written in all the prior channels. A further requirement of the logic is that writing in any B channel shall remove the mark in all preceding B channels. This logic is attained in accordance with an aspect of our invention by the AND gates 50, 51, 52, and 53 and the AND gates 56 in the writing amplifier circuits.

In accordance with another aspect of our invention each dialed digit, when counted in coded form and stored in the latest digit accumulator channels on the line drum and when known to be complete, is transferred to a preassigned group of channels on a separate concentrator or register drum. Specifically in accordance with an aspect of our invention there are provided groups of digit storage channels on the register drum equal in number to the number of digits of the called subscriber, which in present telephone practice is seven of which the first three are the called office designation and the last four the called party designation in that office; further each of these seven groups of digit storage channels are always utilized for the storage of a particular rank of digit, the first digit, whatever its value, being stored in the first group of digit storage channels, the second digit in the second digit storage group, etc. This is attained by the successively activated digit storage gate circuits 40, depicted in Fig. 1, and the specific circuit elements described in detail below.

However, before a digit can be transferred from the latest digit accumulator channels on the line drum 20 to the digit storage channels on the register drum 22 it is necessary to recognize that the digit being accumulated has been completed and also to find the proper slot on the register drum in which it can be stored. The recognition of the end of the counting and coding of the digit in the accumulator channels on the line drum 20 is attained by an interdigital timing circuit 35 utilizing two channels on the drum. This circuit, which may be generally of the type described in application Serial No. 340,472, filed March 5, 1953, of W. A. Malthaner is seen in detail in Fig. 4.

Referring to Fig. 8, we see that in addition to the CRS pulse provided by amplifier 44 and triode 61 once each revolution of the drum 20, amplifier 44 also provides a pulse OPR and a short differentiated pulse delta OPR. This latter pulse is applied to a binary counter 62, seen in Fig. 5, the output of which is taken from cathode follower 63 and tetrode 64 and comprises a pulse whose duration is precisely one revolution of the drum and which occurs every other revolution; this pulse is identified as the CD/ID pulse and is utilized in the interdigit timing. This pulse is applied to the cathodes of the triode sections of the writing logic circuits for the writing amplifiers of the ID1 and ID2 channels, seen in Fig. 4.

Basically, the ID channels time by writing a mark in the ID1 channel when information is present in any of the B or latest digit accumulated channels; a mark is then written in the ID2 channel if, after two revolutions of the drum, the ID1 mark has not been erased and the subscriber line does not have a dial pulse on it; an output pulse is then transmitted two revolutions of the drum later if the ID1 and ID2 marks have not been erased. The ID1 and ID2 marks are erased each time another dial pulse is commenced. Thus if, for a period of six revolutions of the drum after some mark or marks have been placed in the B channels, no more dial pulses arrive to be counted, coded, and written in the B channels, it is assumed that all the dial pulses of that train of dialed digit pulses have been accumulated.

Turning again to Fig. 3 of the drawing, a pulse 67 appears at the output of the cathode follower 65 whenever any of the inputs of the OR gate 66 are active, and thus whenever any mark has been placed in a B channel. This pulse 67 is one input of an AND gate 68 whose other inputs include the pulse SX, indicating that there is not then a dial pulse circuit interruption on the subscriber line, the outputs of the A1 control channel, and that there is nothing in the A2 channel. The output of AND gate 68 is a pulse 69 which is applied to one input of the AND gate 70, Fig. 4. The other input comes from a cathode-follower 75 which in turn gets its input from negative AND gate 72. This other input to gate 70 is always present unless both ID1 and ID2 have a signal, as indicated by negative AND gate 75. The output from gate 70 causes a mark to be written in ID1 channel if nothing had priorly been written there, and if the drum revolution during which it occurs is one during which CD/ID pulse occurs; otherwise a mark is written during the next revolution, when they do occur.

The revolutions of the drum later if the ID1 mark has not been erased by further dialing, the output of the AND gate 70 is applied through an AND gate 73 to cause a mark to be written in the ID2 channel and the ID1 mark to be erased. The other lead of the AND gate 73 indicates that something is present in the cell in the ID1 channel. Two revolutions of the drum later, ID1 is written again. Then two revolutions of the drum later, making a total of six, if the ID1 and ID2 marks have not yet been erased, a negative pulse ID is transmitted by the cathode follower 75 from the negative AND gate 72 and is the output indication that the timer has concluded that the total pulses of that dialed digit have been counted, coded, and registered in accordance with the invention. The pulse ID also removes the enabling signal from one of the inputs of gate 70, thereby stopping the counting action of the ID channels in response to pulses 69.

Figure 4:
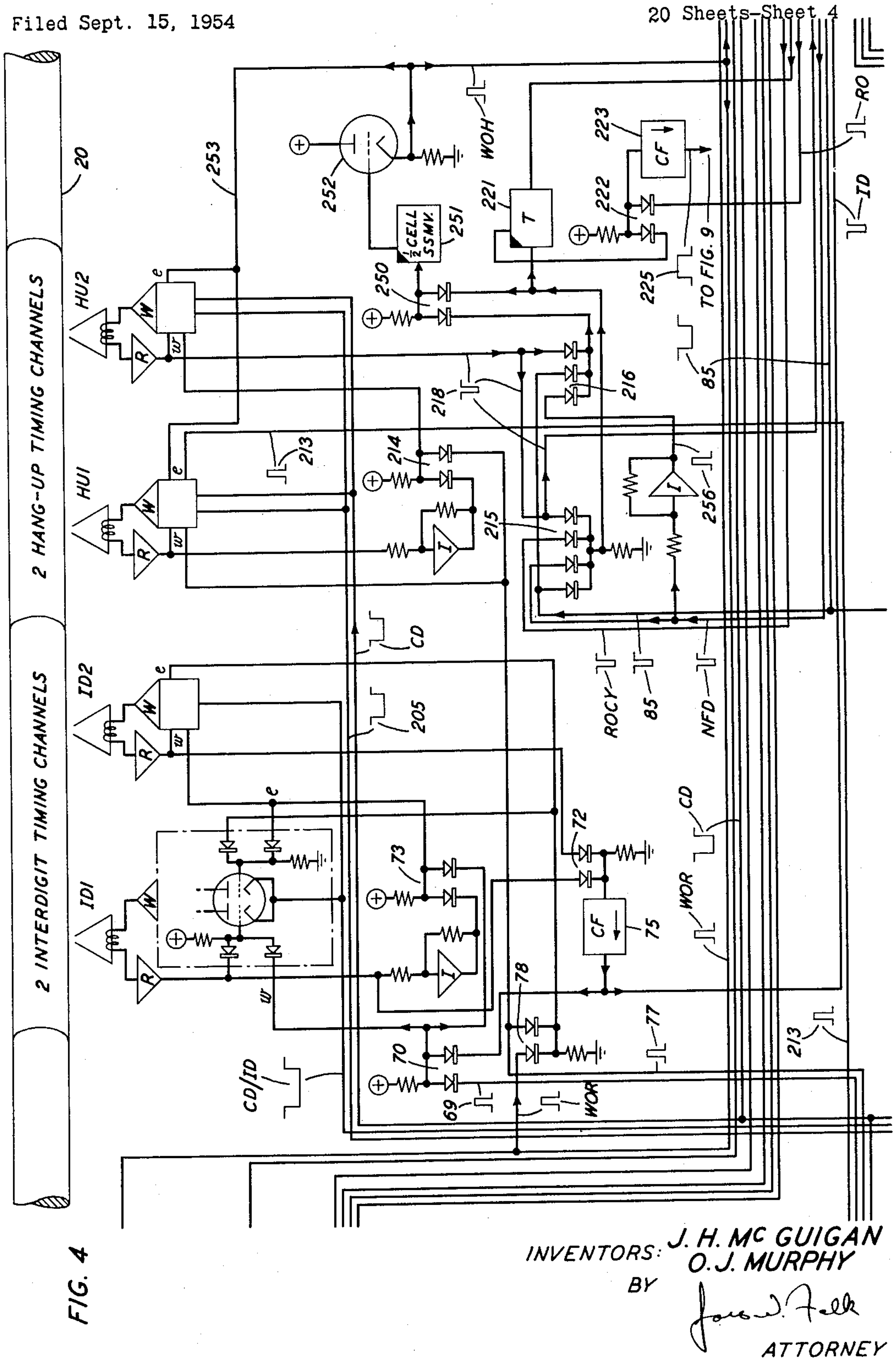
Figure 5:
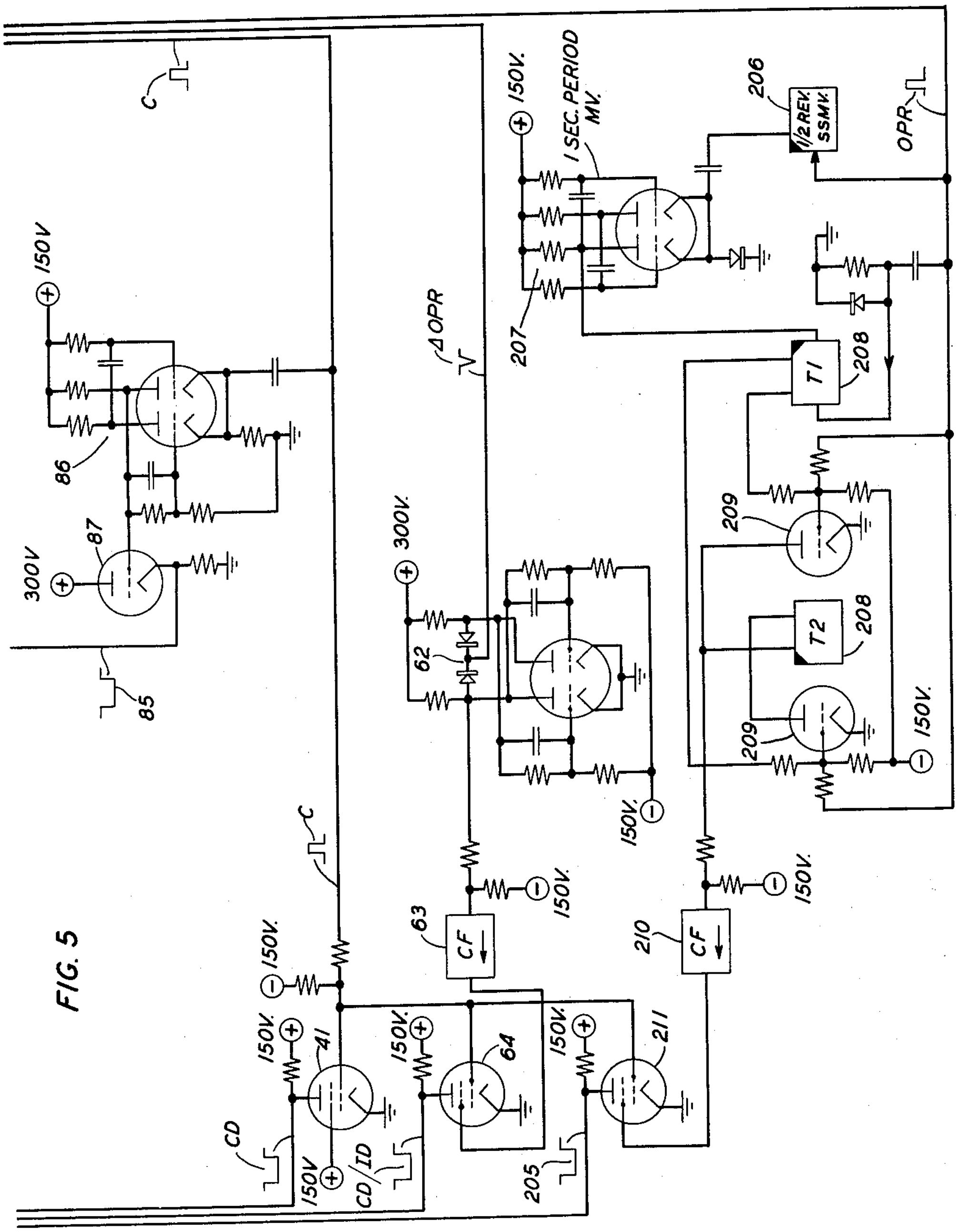

However, if after the writing of the ID1 mark, but before the completion of the process just described, another dial pulse appears on the subscriber's line, AND gate 49 of Fig. 3 is again opened and the output pulse 77 not only causes the writing of the mark in the A2 channel but is also applied through an OR gate 78 of Fig. 4 to the erase logic control gates of the writing amplifiers of the ID1 and ID2 channels to erase marks which may have been priorly written in those channels and thus interrupt the timing operation of the interdigit timing circuit.

When the interdigit timing circuit indicates that the total pulses of the dialed digit have been registered, the digit registered in the latest digit accumulator channels is to be spilled out to the register toggles 33 of Fig. 1 and then written in the appropriate group of channels on the register drum 22. The coded information in the latest digit accumulator channels is read out on each revolution of the line drum 20 and applied to a group of negative AND gates 81, seen in Fig. 6, which control the setting of the toggle registers 33. The other control lead of the AND gates 81 is, through a cathode follower 82, from another negative AND gate 83. The inputs of this AND gate 83 are the interdigit timing pulse ID, indicating that the whole digit dialed has now been counted and stored in coded form in the channels on the line drum, a "sync" pulse 85 and the absence of a pulse ROCY indicating that the register is empty or available for the information. The sync pulse 85 is derived by a sync pulse single shot multivibrator 86 and a cathode follower 87, seen in Fig. 5, from the cell timing pulse C, and serves to synchronize the transfer of information in the system. The ROCY pulse is actually derived from consideration of the equipment number toggle registers but, as described further below, the two register circuits are used simultaneously so that the condition of either may be utilized as a guide for the condition of the other.

Figure 6:
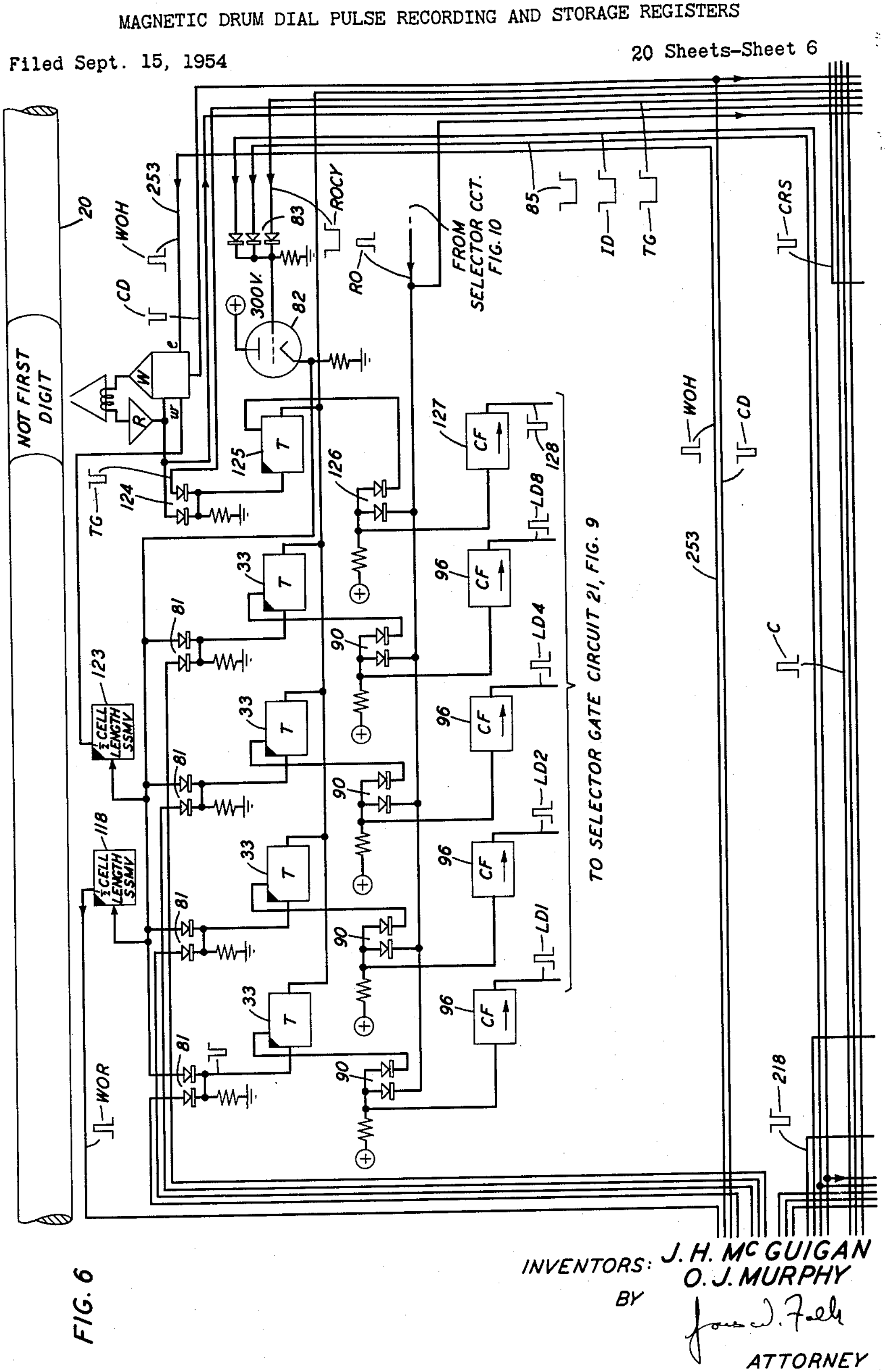

The information stored in the toggle registers 33, Fig. 6, is now available to be written in the appropriate channels on the register drum 22. As described above, in a telephone system incorporating dial digit coding and registration in accordance with aspects of our invention, there are advantageously a number of line drums 20, such as ten, which share a single register drum 22, and each of these drums is assigned a segment of the surface of the register drum. Thus the information on the toggle registers of a line drum should only be presented to the writing amplifiers of the register drum when that segment of the drum is available to the writing heads. Accordingly, each toggle is connected to an output AND circuit 90, one of whose inputs is the output of the toggle register 33 and the other of whose inputs is a read-out pulse RO from the selector circuit 38, Fig. 1, indicating that the sector of the register drum assigned to this line drum is now available to the writing heads of the register drum.

Figure 10:
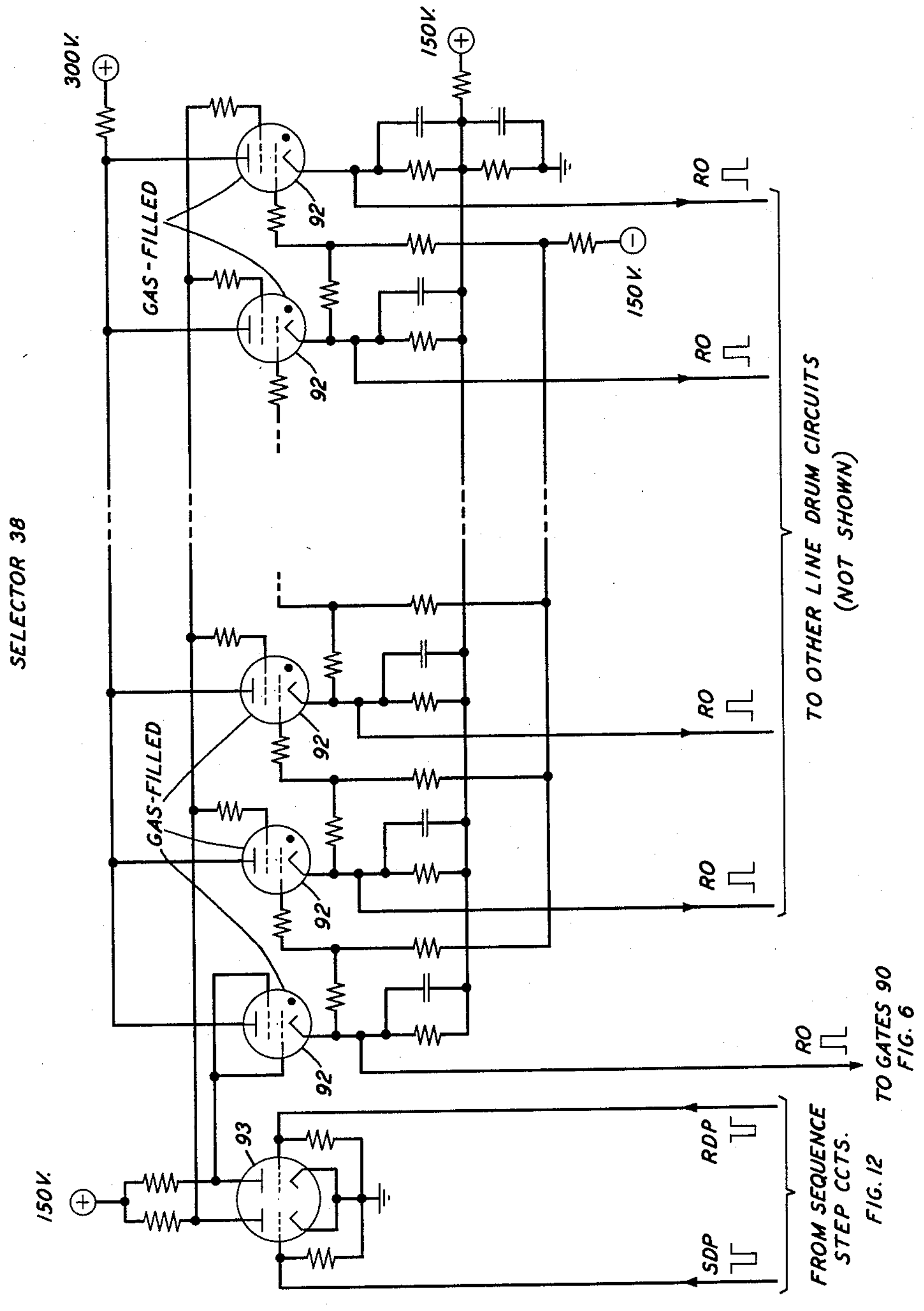
Fig. 10 is a schematic representation of a selector circuit employable in the embodiment depicted in Fig. 1.

One specific illustrative embodiment of a selector circuit 38 is depicted in Fig. 10, and, as there seen, comprises a counter circuit utilizing ten gas discharge devices 92 which conduct in succession. These ten tubes are broken down in succession, as is known in the art, by revolution and section defining pulses, RDP and SDP, respectively, read from the sequence step channels of the register drum, and applied to two halves of a double triode tube 93. The two sequence step channels, as seen on the register drum 22 in Fig. 11, have a single mark in one channel, defining the successive revolutions of the drums, and nine marks equally spaced around the drum in the other channel, defining the nine other sectors of the drum. The marks are read from the channels and amplified by amplifier circuits 95, as is known in the art and shown on the drawing.

Figure 9:
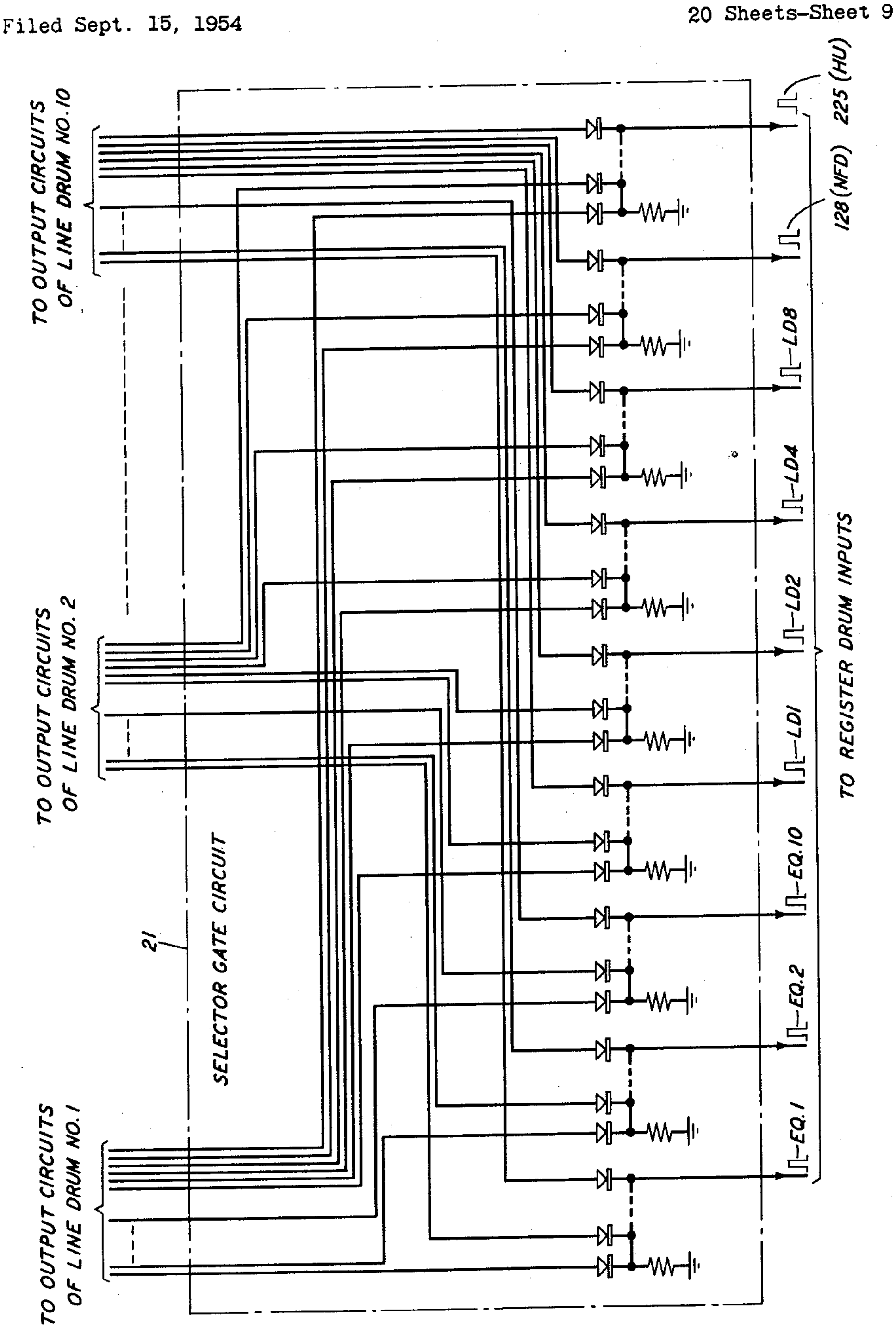
Fig. 9 is a schematic representation of a selector gate circuit employable in the embodiment depicted in Fig. 1.

When there is information in the toggle registers 33 and the RO pulse occurs, the gates 90, Fig. 6, are enabled and the coded digit stored is passed through the cathode follower circuits 96 to the selector gate circuits 21, seen in Fig. 9, which merely, in this embodiment, comprise a number of positive OR circuits for each group of leads from the various line drum circuits. The information pulses thus transmitted by the cathode followers 96 through the gate circuits 20 to the register drum storage gate and steering circuits, described below, will be referred to as the latest digit pulses LD1, LD2, LD4, and LD8.

We have now described the coding of the dialed digits and their presentation to the digit storage and steering circuits of the register drum for registration on that drum. However, before describing that portion of the circuit, let us discuss the equipment number counter and toggle circuit 36, seen in Fig. 1, and the associated circuitry for locating a particular slot on the register drum 22.

As discussed above, the slots on the line drum 20 are counted and the count or number of each slot is its identification. This is accomplished, in this specific illustrative embodiment of this invention, by the equipment number counter circuit 36 seen in detail in Fig. 7, and comprising pairs of triodes 98. The counter circuit may be any of a number of binary counters known in the art, the specific counter depicted in the drawing employing input diodes 99 for each counter section. The cell defining pulse CD is applied, through a cathode follower 101 and a half cell-time delay line 102 to the input diodes 99 of the first counter section. In one illustrative embodiment wherein of the order of a thousand subscriber lines utilize a single line drum, there are ten counter sections each comprising the pair of triodes 98 and diodes 99. The counter is reset to zero count once each revolution of the magnetic drum by the counter reset pulse CRS transmitted by triode 61, seen in Fig. 8.

The count of the binary counter circuit indicating the equipment number is applied from each counter section to negative AND gates 105 the other input of which is a toggle gate pulse TG. The toggle gate pulse TG is applied from a negative AND circuit 106 through a cathode follower 107 and indicates that the toggle registers 109, in which the equipment count is to be temporarily stored, are available or unoccupied, and that either an interdigital time has occurred, indicating the end of the dialed digit, or the subscriber has hung up; for the moment we shall not concern ourselves with hang-up conditions and operation. The inputs to gate 106 are thus the pulse ROCY, a pulse 110, which for the moment we may consider as equivalent to the pulse ID from which it may be derived in an OR gate 111, and the synchronizing pulse 85. Thus when a TG pulse occurs the equipment number count is registered in the toggle registers 109 and the ROCY signal is generated by any registration in the toggles, the ROCY signal then being operative to close gate 106, and thereby close all toggle input gates 105 to prevent any further input until the stored registration has been used or canceled. The ROCY pulse is actually the output of an OR circuit whose inputs are diodes connected to each of the toggle registers 109 and to the single-shot multivibrator 119. This count is split out of the registers 109 when the AND gates 113 are opened by the occurrence of the read-out pulse RO from the selector circuit 38, seen in Fig. 10, indicating the appropriate sector of the register drum for this line drum is under the writing heads of the register drum. Referring back to Fig. 7, the equipment number count is then applied through cathode followers 114, and thence, in Fig. 9, to a group of OR circuits in the selector gate circuit 21. The output of these OR circuits is led to the equipment number storage channel circuits on the register drum, seen in Fig. 19, and described further below with reference to the operation of the register drum circuits. The pulses from the cathode followers 114, indicating the equipment number count will be subsequently referred to as the equipment number pulses EQ1 through EQ10, for this specific embodiment.

The register toggles 33 of Fig. 6 and 109 of Fig. 7, which registers temporarily store the latest digit pulses LD and the equipment number pulses EQ, are reset by a register reset pulse RRS whenever any information is written in the digit storage channels on the register drum, as described further below. A pulse 116 is applied from the register drum circuits to an inverter 117, seen in Fig. 7, which applies the reset pulse RRS to a two microsecond delay line 118 and to a 3½ cell single shot multivibrator circuit 119. The delay line 118 assures that the toggle registers 33 and 109 are not reset by the pulse RRS until the multivibrator 119 has been triggered. The multivibrator in turn applies a voltage to the register-occupied bus through its OR circuit diode input, assuring the appearance of a registered occupied pulse ROCY while the toggle registers are settling down after they have been reset so that no new information can be inserted into the toggle registers until they assuredly have been reset to their normal condition.

When the digit coded and written in the latest digit channels on the line drum 20 is stored in the toggle registers 33, on enablement of the gates 81 by a pulse from gate 83 through cathode follower 82, a one-half cell length single shot multivibrator 118, seen in Fig. 6, is also enabled and transmits an erase pulse WOR to the erase gates of the writing amplifiers 48 of the latest digit accumulator channels, the WOR pulse passing through an OR gate 119, seen in Fig. 3, and a cathode follower 120; the other input of the OR gate 119 is an erase pulse WOH which occurs on hang-up, which will be described further below. The erase pulse WOR is also applied to the OR gate 78, seen in Fig. 4, to cause erasure of the interdigit timing marks in the interdigit timing channels.

As discussed above with reference to the general outline of this embodiment of the invention depicted in Fig. 1, the operation of the register drum circuitry is slightly different for the first digit dialed and for subsequent digits. It is therefore necessary to advise the register drum circuitry whether a particular digit and equipment number appearing as the latest digit and equipment number pulses LD and EQ, respectively, are related to the first dialed digit or subsequent dialed digits. Accordingly, a not-first-digit channel, Fig. 6, is employed on the line drum 20. The writing gate of the amplifier circuit 48 for this channel is also enabled on passage of a pulse through the negative AND gate 83 and cathode follower 82; this pulse is applied to the writing amplifier through a pulse-stretcher comprising a half-cell-length single shot multivibrator 123. The writing logic for writing in the not-first-digit channel is that an interdigit timing has occurred, indicating that any subsequent digits must be other than the first digit, that the toggle register is not occupied, the appearance of the synchronizing pulse 85, and that there be nothing written in the channel itself.

The not-first-digit pulse NFD is read from the channel and passed through an AND gate 124 which is enabled by the toggle gate pulse TG. The not-first-digit information is then stored in a toggle register 125 from which it is passed through an AND gate 126, enabled by the readout pulse RO, and through the cathode follower 127. The output of the cathode follower 127 is a not-first-digit pulse 128 which is applied to an OR gate in the selector gate circuit 21 and thence to the register drum circuits.

The not-first-digit mark is erased on hang-up of the call by the subscriber, as described further below.

We have thus available at the output leads of the selector gate circuit 21 the latest digit pulses LD, the equipment number pulses EQ, and information, in the presence or absence of the not-first-digit pulse 128, indicating whether the digit pulses LD represent a first or a subsequent digit. The register drum and associated circuitry in accordance with one specific illustrative embodiment of this invention are depicted in Figs. 11 to 19 and will now be described in detail.

As mentioned above, each line drum 20 is assigned a segment of the circumference of the register drum 22 and the information from any line drum can only be transmitted to the register drum when the segment for that line drum is available to the magnetic writing heads of the register drum. This is determined by the selector circuit 38, seen in Fig. 10 and described above, under control of the sequence step pulses, namely, the revolution and section defining pulses RDP and SDP. These pulses are read from two channels on the register drum, seen in Fig. 11, and amplified by the amplifiers 95. The RDP and SDP pulses are also applied to a line-drum-identifier counter 130, seen in Fig. 12, which may be a number of binary stages of the same type as the equipment number counter 36, seen in Fig. 7. In general only a few stages, such as four, will be required because the number of line drums to be identified is small, such as ten. Only the first and last stages of the counting chain are shown in Fig. 12. The outputs of this counter circuit 130 are applied, through AND gates 131 to toggle circuits 132. The other input to AND gate 131 comes from the display register gate bus and is provided only when a completed called number has been accumulated in the register drum. Neon lamps 133, or other indicating devices, are connected to the toggles 132 so that if we consider this as a manual operation, an operator will be able to recognize the line drum from which the information displayed originated. This indication, plus the equipment number information, identifies the subscriber who dialed the number.

While a dial pulse coder and register circuit in accordance with this invention may most advantageously be employed in automatic telephone switching systems, as of the type described in the aforementioned Malthaner-Vaughan application, for purposes of exposition of the operation of this specific illustrative embodiment of the invention it will be assumed that after the number has been dialed, an operator manually sets up the call between the subscriber who did the dialing and the subscriber represented by the dialed number.

Figure 11:
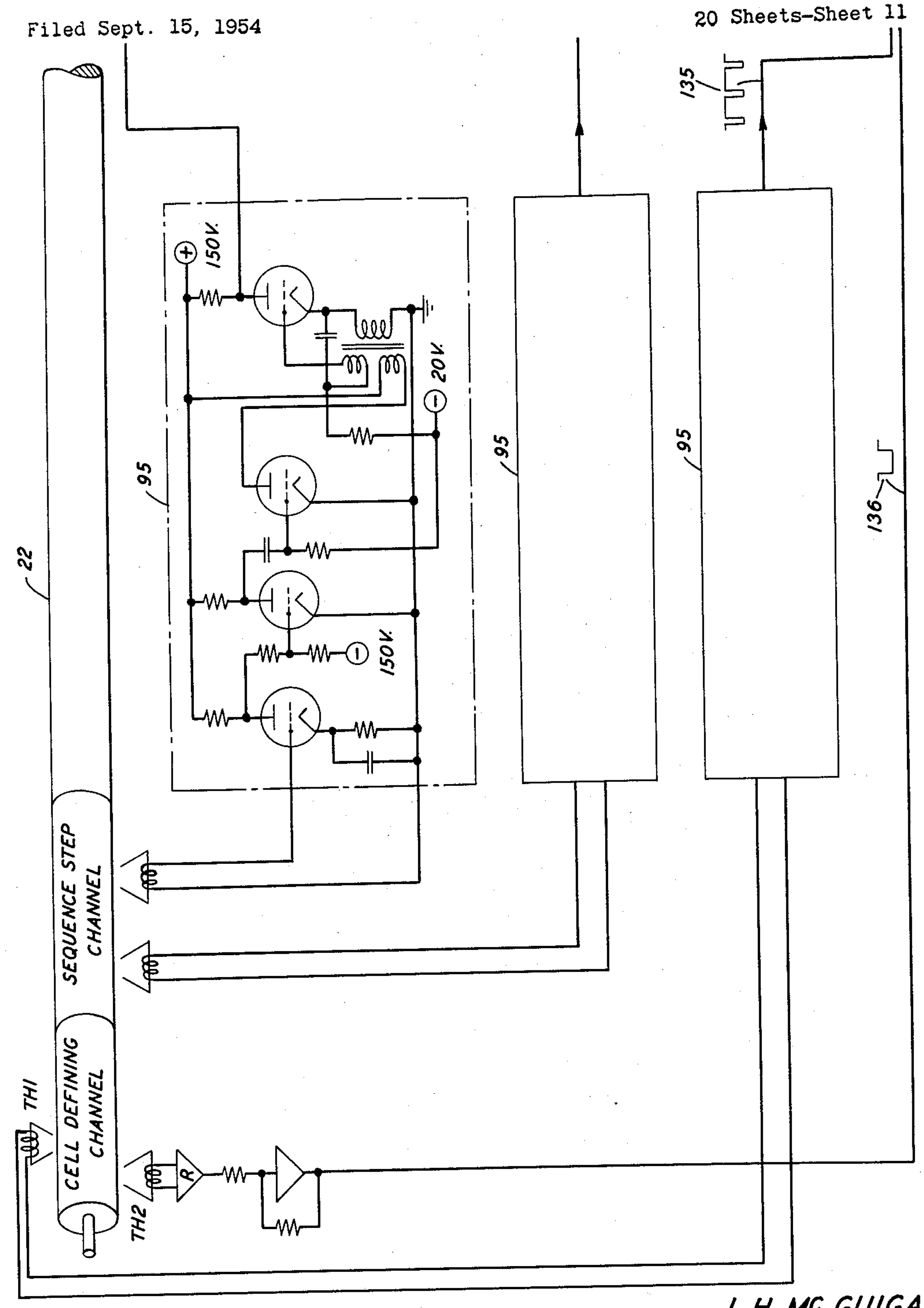
Figs. 11 through 19 are a schematic representation of one specific embodiment of register drum circuitry employable in the embodiment depicted in Fig. 1, the figures being arranged as shown in the key diagram of Fig. 26.
Figure 12:
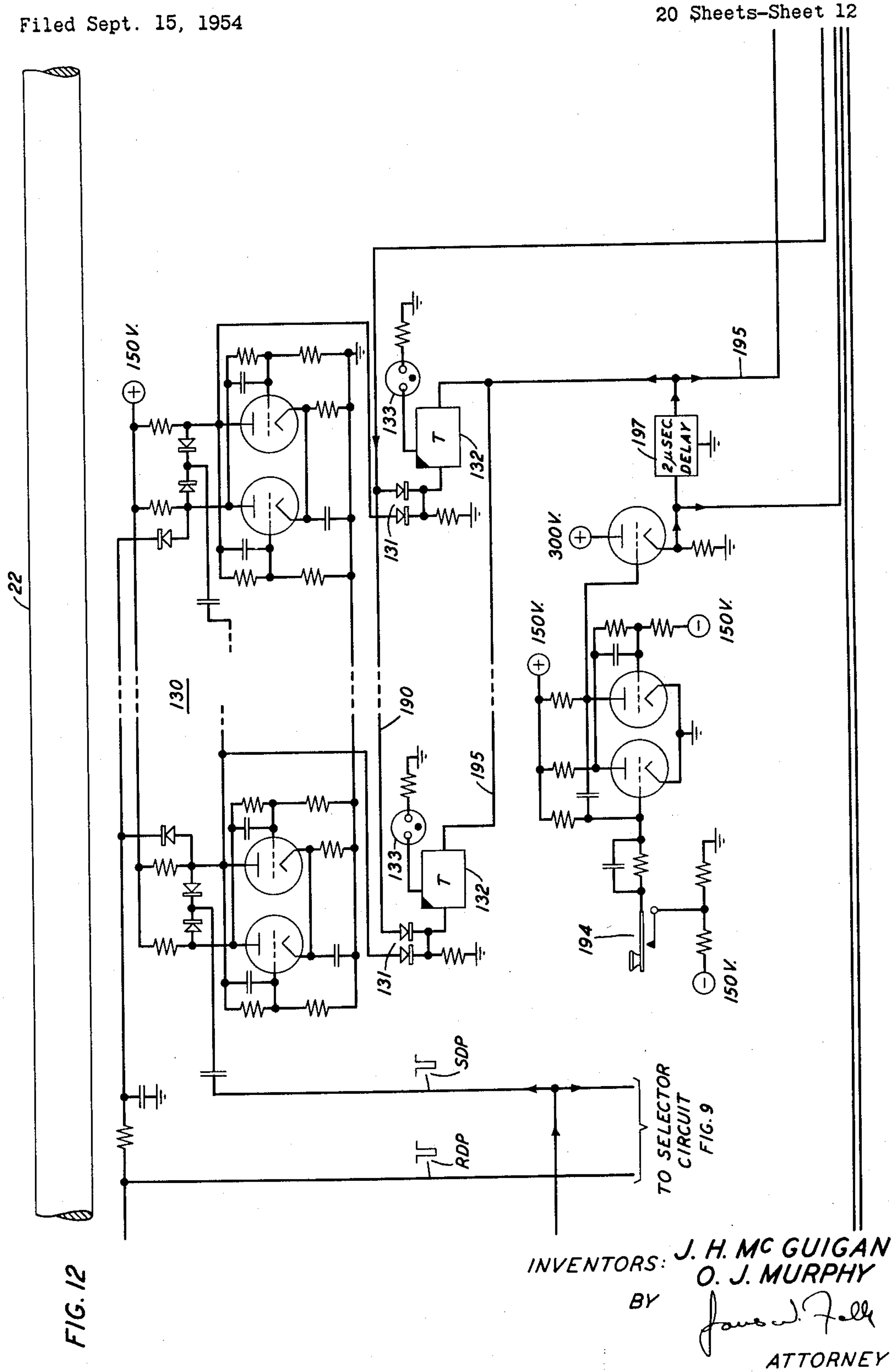

Advantageously, there are two cell defining pulses derived from a channel on the register drum, seen in Fig. 11. The output of one reading head TH1 provides a cell defining pulse 135 after appropriate amplification by an amplifier circuit 95, and is used to synchronize the writing operation. The output of the other reading head TH2 provides a cell defining pulse 136, slightly earlier in time, which is used for sampling the read outputs of the other channels of the register drum. Since the marks which are read by these heads are assumed to be uniformly spaced, one head may be displaced from the other by any integral number of marks or cells without affecting the time relations of the outputs. The actual spacing must therefore be any integral number of cells plus a certain small fraction of a cell to give the desired time advance of the TH1 output with respect to TH2.

Figure 19:
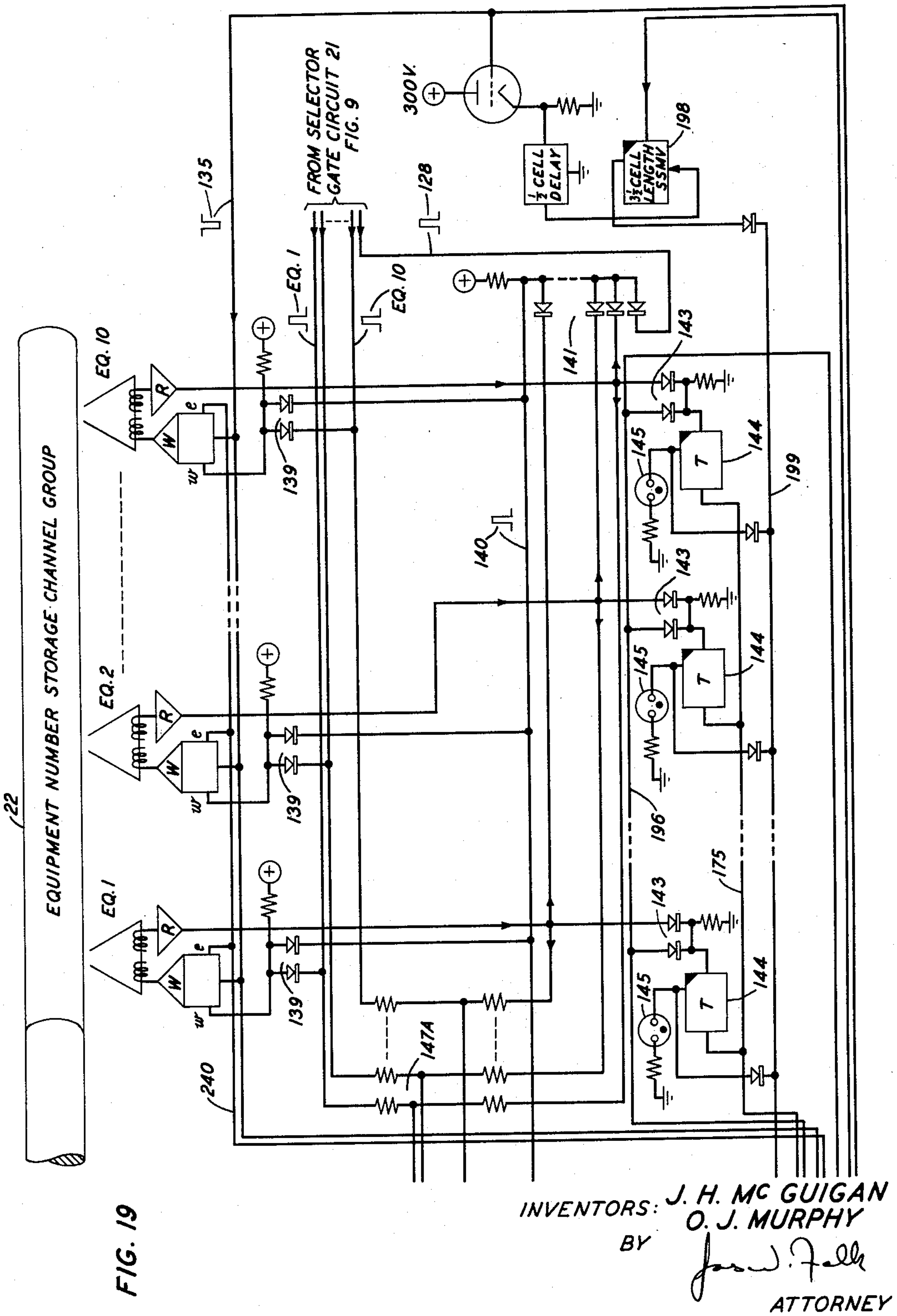
Figure 20A:
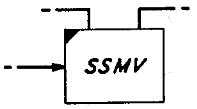
Figs. 20A and 20B are the block diagram representation and one illustrative circuit embodiment of a single shot multivibrator employable in the specific embodiment of this invention disclosed.
Figure 20B:
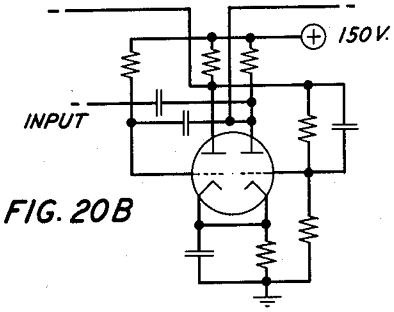
Figure 21A:
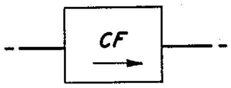
Figs. 21A and 21B are the block diagram representation and one illustrative circuit embodiment of a cathode follower employable in the specific embodiment of this invention disclosed.
Figure 21B:
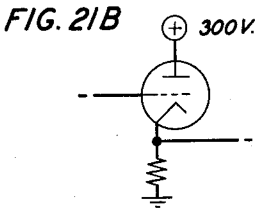
Figure 22A:
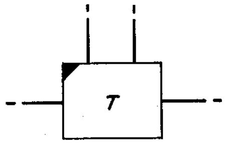
Figs. 22A and 22B are the block diagram representation and one illustrative circuit embodiment of a toggle circuit employable in the specific embodiment of this invention dsclosed.
Figure 22B:
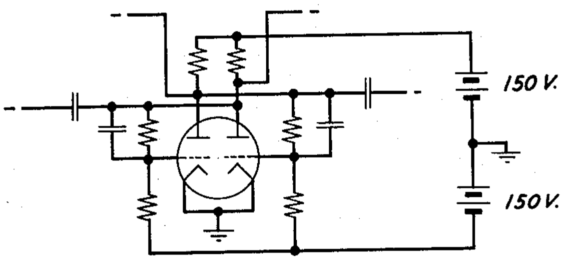

When the selector circuit 38 indicates that the segment of the register drum 22 assigned to the line drum we have been considering is available the equipment number pulses EQ and the latest digit accumulated pulses LD are transmitted through the OR gates of the selector gate circuit 21 to the register drum circuit. Let us first consider the transfer of the EQ and LD pulses for the first dialed digit. The equipment number storage channels are depicted in Fig. 19. The equipment number pulses EQ are applied, through AND gates 139 to the writing gates of the writing amplifiers. The other input to the AND gates 139 is a pulse 140 from a positive AND gate 141, the inputs of which are leads from the reading amplifiers of each of the equipment number channels and a lead from the not-first-digit OR gate of the selector gate circuit 21. Accordingly the AND gates 139 are only energized and an equipment number written on the register drum if there is no equipment number priorly written in any of the cells of the slot and if this is the first digit of the number. Thus the equipment number information and the first dialed digit, which have been waiting in the toggles 109 and 33, are written into the first empty slot in the assigned sector which passes under the heads.

The equipment number thus written in these channels is read out on subsequent drum revolutions and applied to AND gates 143 leading to toggle registers 144 but the other input to the AND gates 143 is not present at this time so no further action ensues at this time in this path. The equipment number is also read out and compared, by a match detector circuit 147A and 147B seen in Figs. 19 and 17, with subsequent equipment numbers EQ applied from the selector OR gate circuit 21, as described further below.

Figure 13:
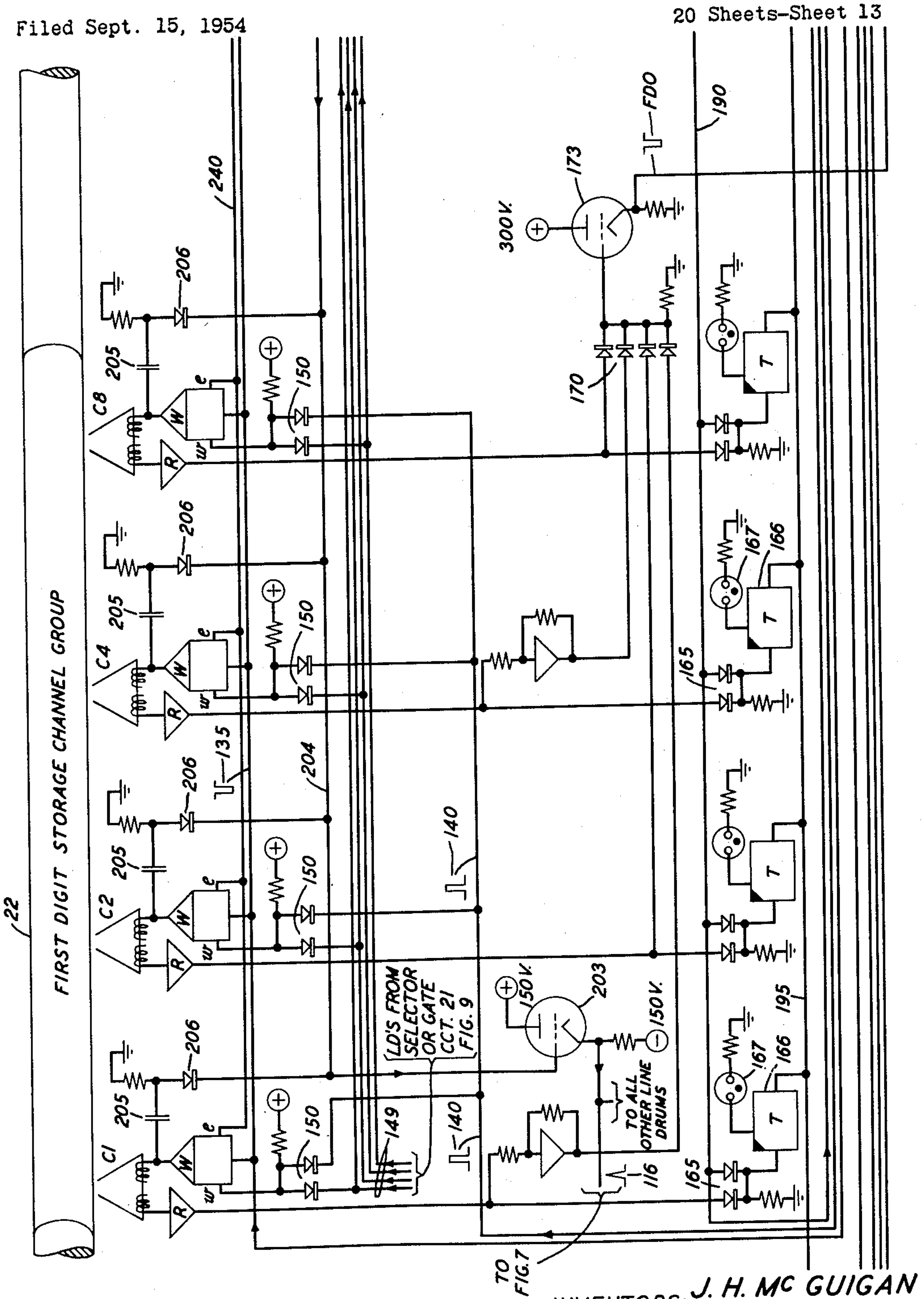

While the equipment number is being written in the equipment number channels on reception of the first dialed digit, the latest digit pulses LD, representing this first dialed digit, are applied, as seen in Fig. 13, to latest digit buses 149 and specifically to AND gates 150 connected to the buses 149 and thereby to the writing amplifiers of the first digit storage channels. The other input to the positive AND gates 150 is the pulse 140 from AND gate 141 of Fig. 19 which is only present when the first digit is being stored.

In accordance with an aspect of this invention the dial digits are steered, by the selectively activated storage gate circuits 40, depicted in Fig. 1, so that each digit is written in succession in the appropriate digit storage channels. Thus in accordance with this invention the pulses representing, in coded form, the first dialed digit are always steered to the first dialed digit channel, in a slot of which they remain; the pulses representing the second dialed digit are always steered to the second digit storage channels, in the same slot of which they remain, etc. These various steering gates are the gates associated with the latest digit buses 149 as described herein.

All digit pulses LD are of course applied to gates in each of the digit storage channel groups. However, considering the second digit storage channels, seen in Fig. 14, the writing amplifiers are only enabled when AND gates 152 are enabled; each of AND gates 152 has as its control inputs one of the latest digit buses 149, an input lead from a negative OR circuit 153 indicating that nothing is written in any of the second digit channels, and a pulse 154 indicating that a match has been found by match circuit 147 and that this is not the first digit. Accordingly, the first digit cannot be written in the second or later digit storage channels.

Figure 17:
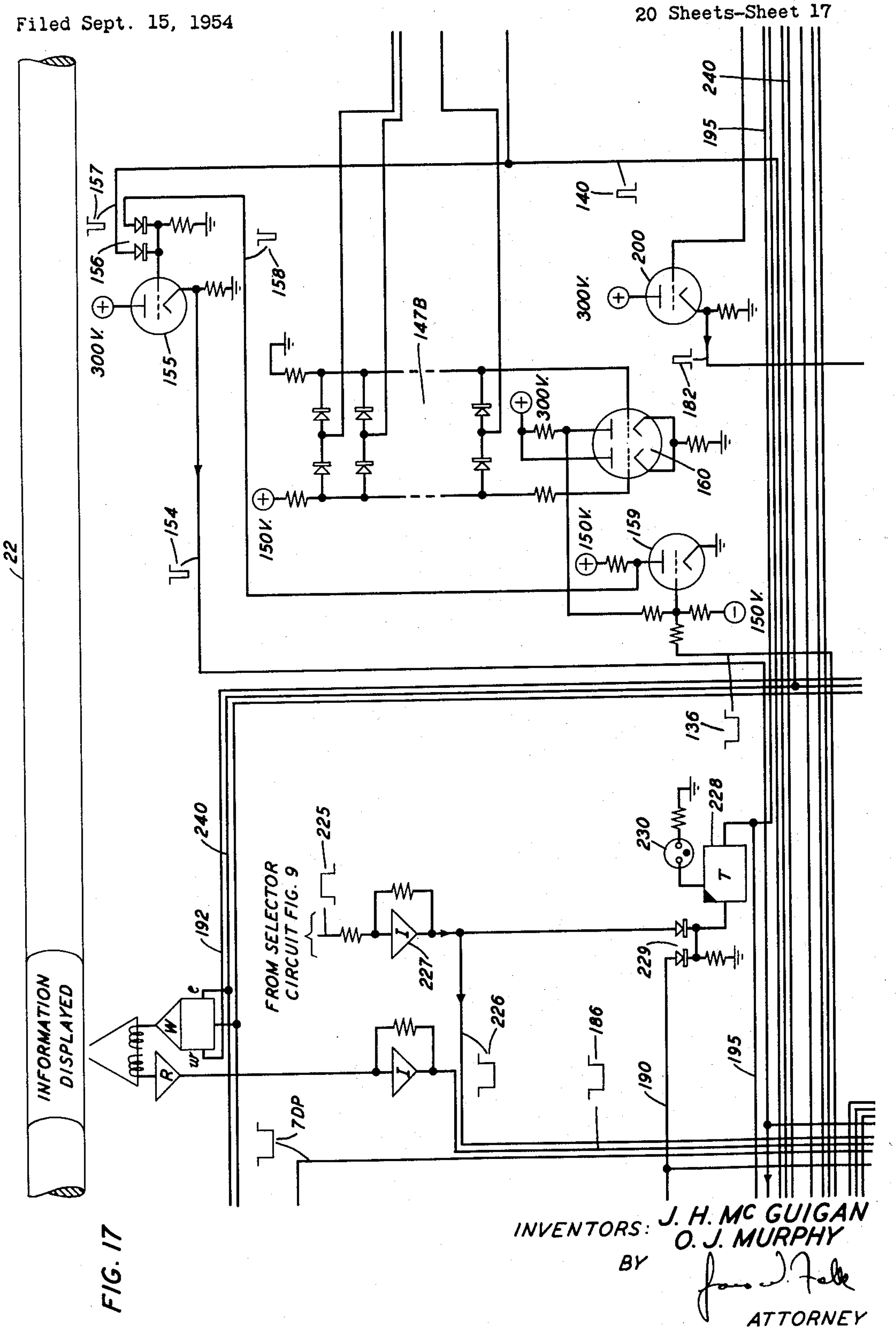

Pulse 154 is derived from cathode follower 155, seen in Fig. 17, the inputs of which are applied through a negative AND gate 156. The inputs to this AND gate are a pulse 157, which is the inverse of pulse 140 and indicates that there is something registered in at least one of the equipment number channels and therefore that the first digit has occurred, and a pulse 158 derived from the plate of triode 159. Triode 159 produces a negative pulse 158 whenever a match has occurred, as detected by match circuit 147A and 147B and triodes 160.

When the second digit pulses LD are present on the latest digit buses 149, the pulses will therefore be steered to the second digit storage channels. They cannot be registered in the third digit storage channels as each subsequent group of storage channels includes as an additional control lead to the AND gates 162, seen in Fig. 15 for the third digit storage channels and Fig. 16 for the seventh digit storage channels, a pulse 163 which is the inverted output of the OR circuit 153 of the prior storage channels. Accordingly one control for the AND gates 162 is that there be something registered in the prior storage channel group. Therefore in accordance with an aspect of this invention, the latest digits dialed, as presented on the latest digit buses 149, are steered to the appropriate storage channels assigned to the storage of that particular digit in the sequence of the dialed number.

The reading amplifiers of each of the storage channels of all digit storage channel groups are connected by AND circuits 165 to toggle registers 166, the outputs of which are utilized to light neon lamps 167, or other indicating devices, which inform the operator visually of the number dialed. The operator will thus have appearing before her on the neon lamps 133, 145, and 167 the indication of the subscriber desiring the connection and of the number that he has dialed, provided AND gates 165 have been opened, which happens only when the dialed information is recognized as being in one of several "complete" forms.

Figure 14:
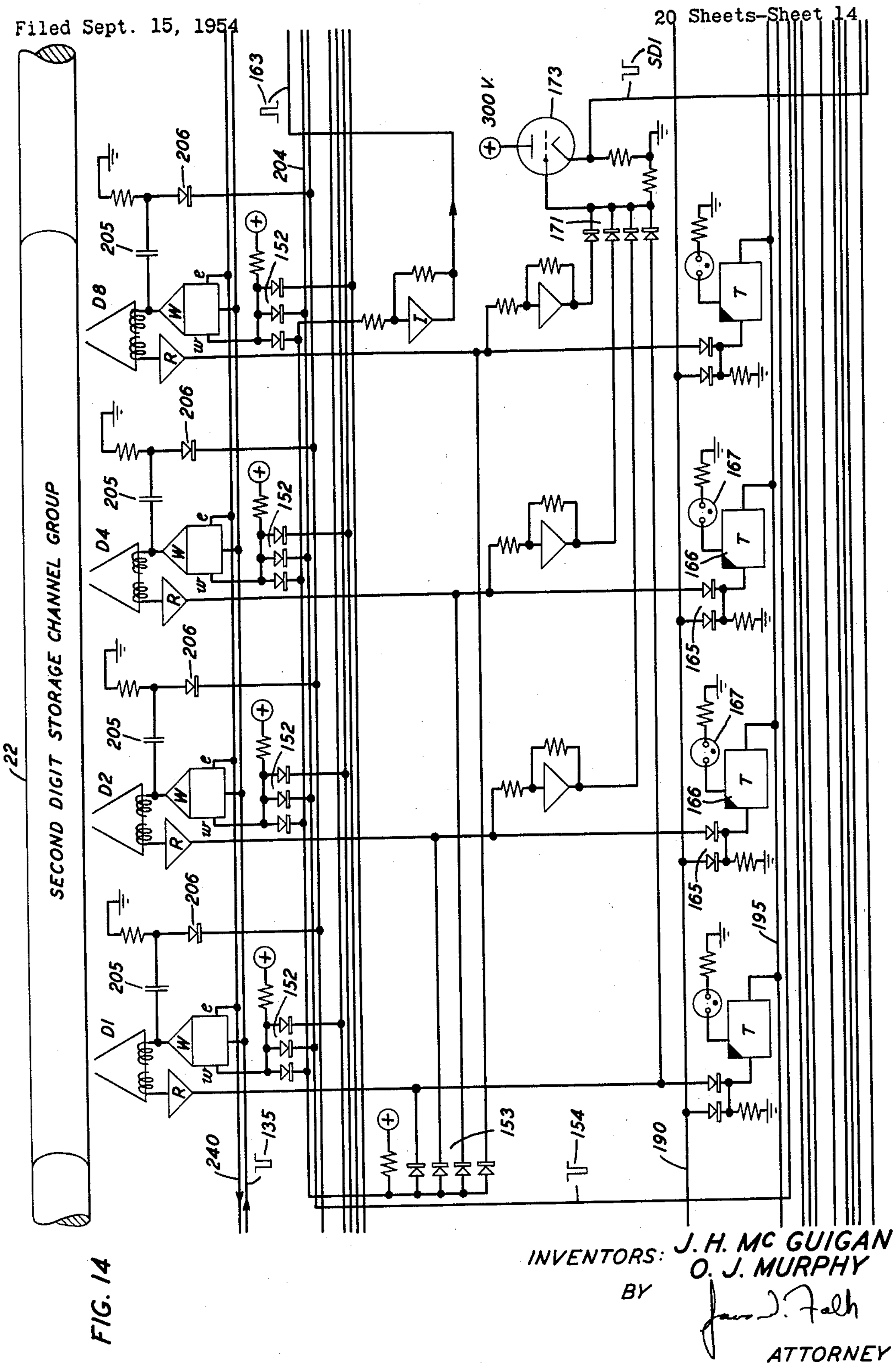
Figure 15:
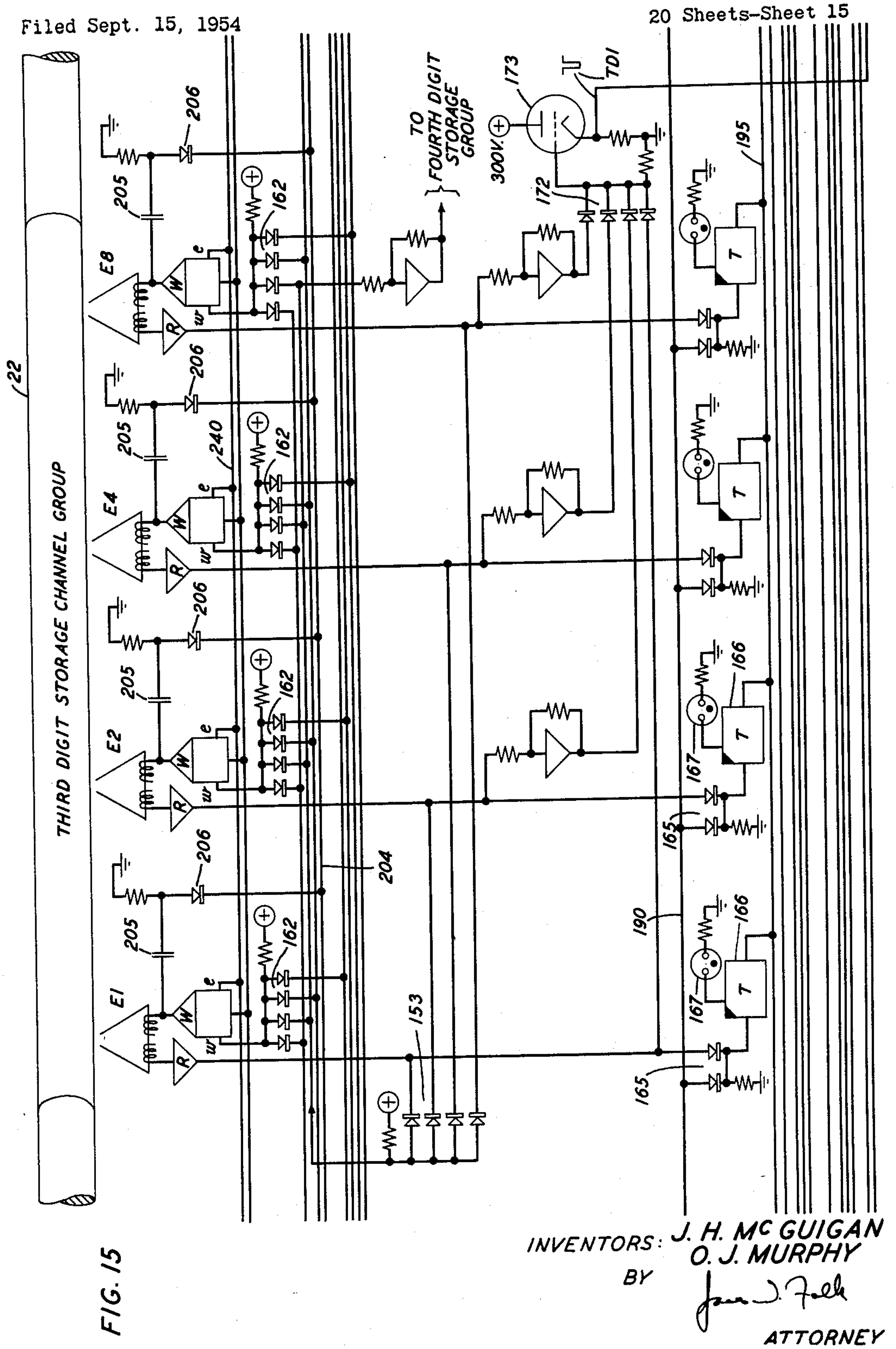
Figure 16:
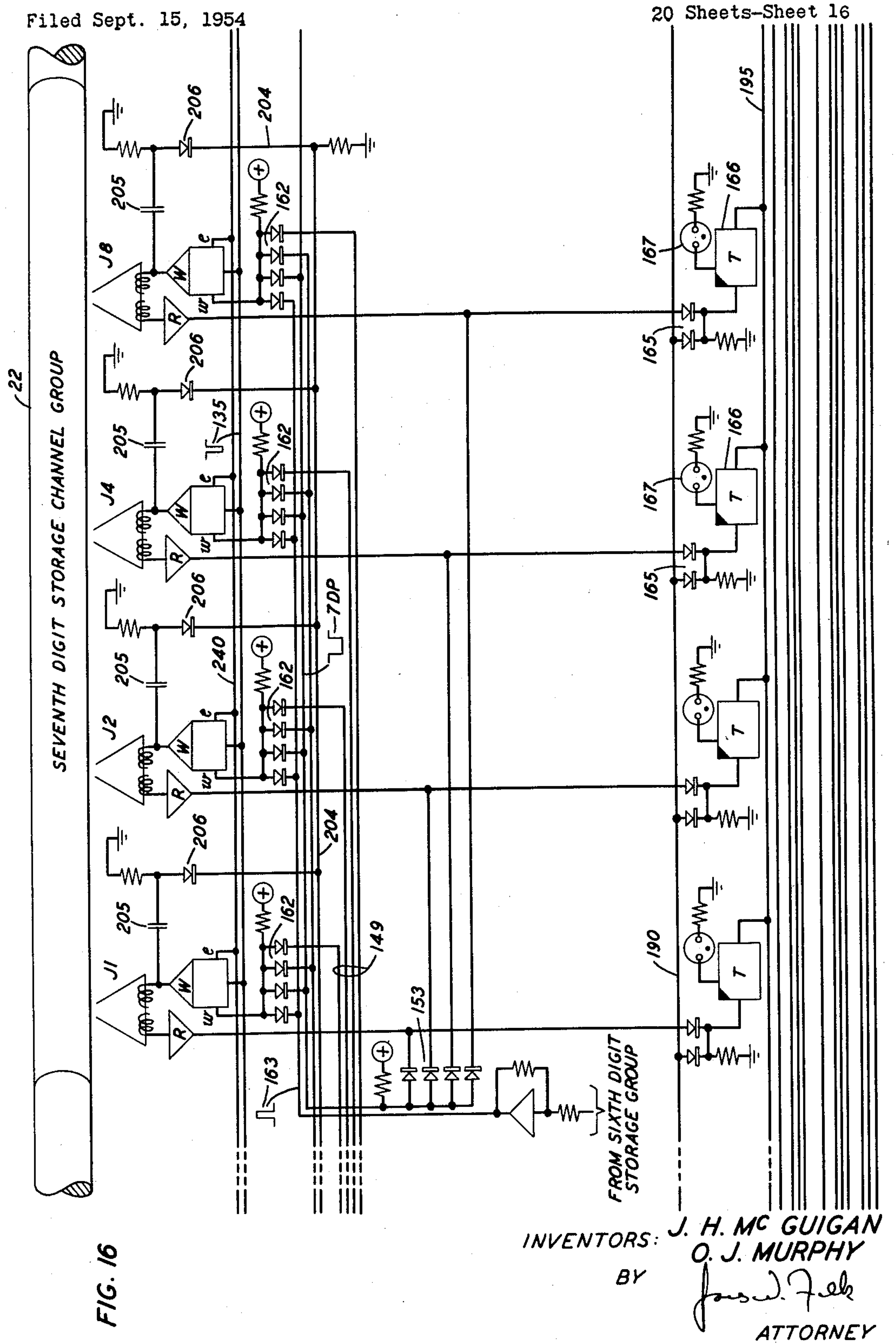

The outputs of the reading amplifiers of the first, second and third digit storage channels are connected, with appropriate inversions, to negative AND gates 170, 171, and 172, seen in Figs. 13, 14, and 15, respectively, the outputs of which are applied through cathode followers 173 and are pulses FD0, SD1, and TD1, respectively, indicating the special codes for first digit "0," or first digit any value and second and third digit "1," which are used in present day telephone systems for connection to special operators for information, long distance calls, etc., and which are therefore "complete" numbers even though comprising only one or only three digits, instead of the expected seven.

Figure 18:
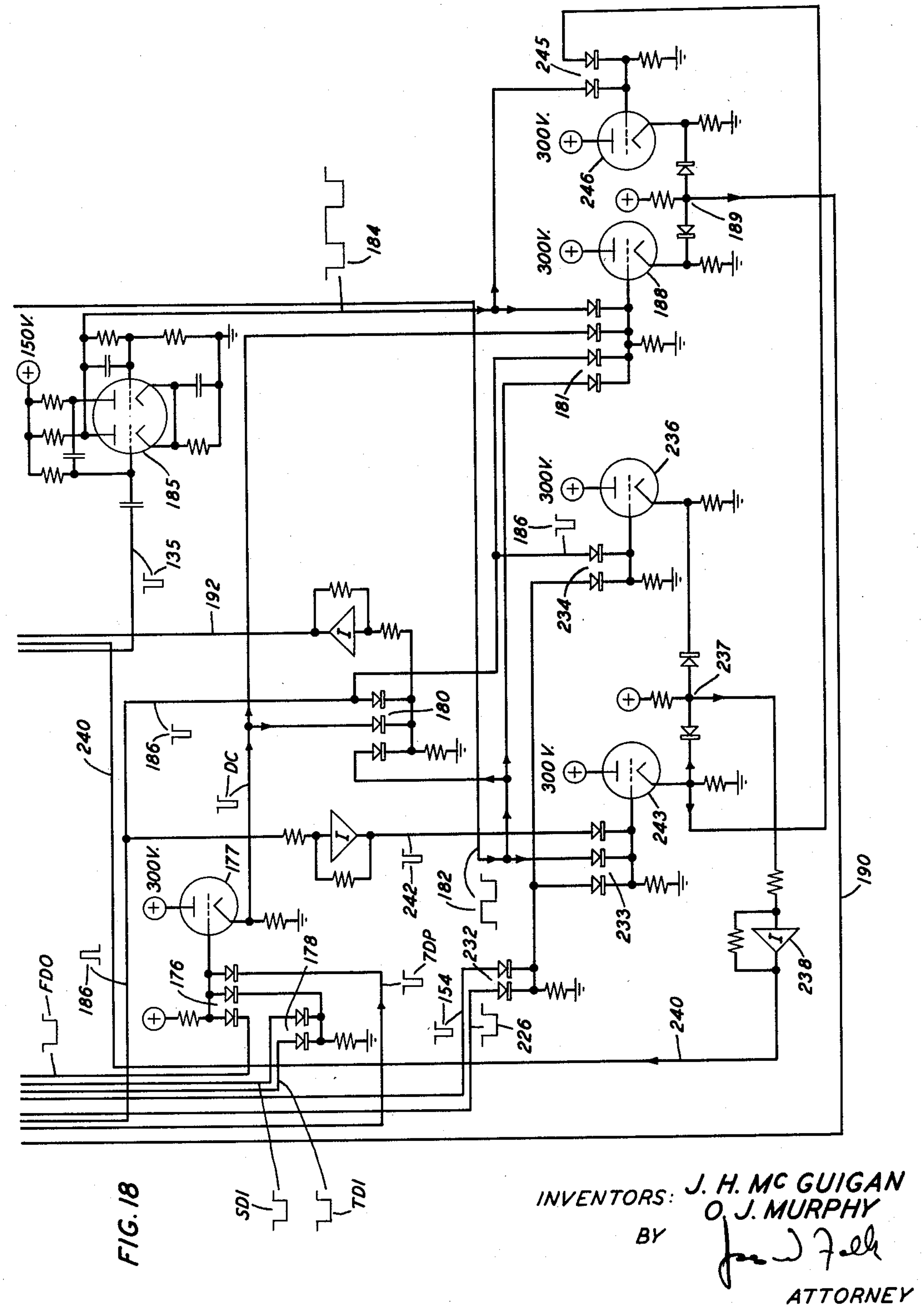

The output of the OR circuit 153 of the seventh digit channel, which in this embodiment is the final digit of the dialed number, and is therefore the ordinary indication of a "completed" number, is a seventh digit present pulse 7DP which is applied, through a negative OR gate 176, seen in Fig. 18, to a cathode follower 177. The other inputs to the OR gate 176 previously mentioned are the first digit "0" pulse FD0, from the first digit storage channels, and the presence of both the second digit "1" and third digit "1" pulses, SD1 and TD1, from the second and third digit storage channels, as combined in a negative AND gate 178. On the occurrence either of a 7DP pulse, indicating the completion of the dialing of the total number, or of these other pulses indicating completed special codes, the dialing is known to have been completed.

When the dialing is completed, the dialing-complete pulse DC from the cathode follower 177 is applied to two negative AND gates 180 and 181, seen in Fig. 18. Considering the inputs to gate 181 first, these inputs include a pulse 182 indicating that the equipment number display toggles 144 are empty and do not have a prior equipment number stored in them, the dialing complete pulse DC, a synchronizing pulse 184 derived by a single shot multivibrator circuit 185 from the synchronizing pulse 135, and an information-not-displayed pulse 186. This last pulse is read from an information displayed channel on the register drum, seen in Fig. 17, and inverted; the pulse 186 thus indicates that there is not written in this channel a mark indicating the information to be used by the operator in setting up the call has been displayed on the neon bulbs 133, 145, and 167.

The output of gate 181 applies a pulse through a cathode follower circuit 188 and a negative OR gate 189 to a display register gate bus 190. This bus 190 is connected to each of the AND gates 131, 143, and 165 to provide the control for these gates to permit the operation of the toggle registers 132, 144, and 166 causing the information to be displayed on the neon lamps, as described above.

The inputs to AND gate 180 are the dialing complete pulse DC, the register empty pulse 182, and the information-not-displayed pulse 186. When all these are present gate 180 will have been enabled and thus the information will be displayed. Accordingly the inverted output of gate 180 is applied, by a lead 192, to the writing amplifier circuit of the information-displayed channel to cause a mark to be written in the slot of that channel indicating that the information is displayed. Due to the relative timing of the synchronous pulses 135 and 184, the mark will be written after the gate 181 has been enabled.

The operator will thus now have before her the information, on the various neon bulbs, necessary for her to set up the connection desired, assuming, as discussed before, manual operation of the switching network. When the connection has been set up, the operator presses a clear register key 194, seen in Fig. 12, which applies a reset pulse to a display register reset bus 195 connected to each of the toggles 132, 144, and 166. This resets the toggles and turns off the neon bulbs. The reset pulse is applied to the reset bus 195 through a 2 microsecond delay line 197 allowing a 3½ cell-length single shot multivibrator 198, seen in Fig. 19, to operate before the toggles are reset. Multivibrator 198 applies a pulse to a register-occupied bus 199 connected to the grid of cathode follower 200, the output of which is the register occupied pulse 182. Each of toggles 144 is similarly connected to bus 199 so that this bus is energized if any of the toggles 144 or multivibrator 198 is energized. Multivibrator 198 assures that sufficient time will be available for the toggle registers to settle down to their normal condition before new information is applied to them, thus acting in the same manner as multivibrator 119, described above and seen on Fig. 7.

Figure 7:
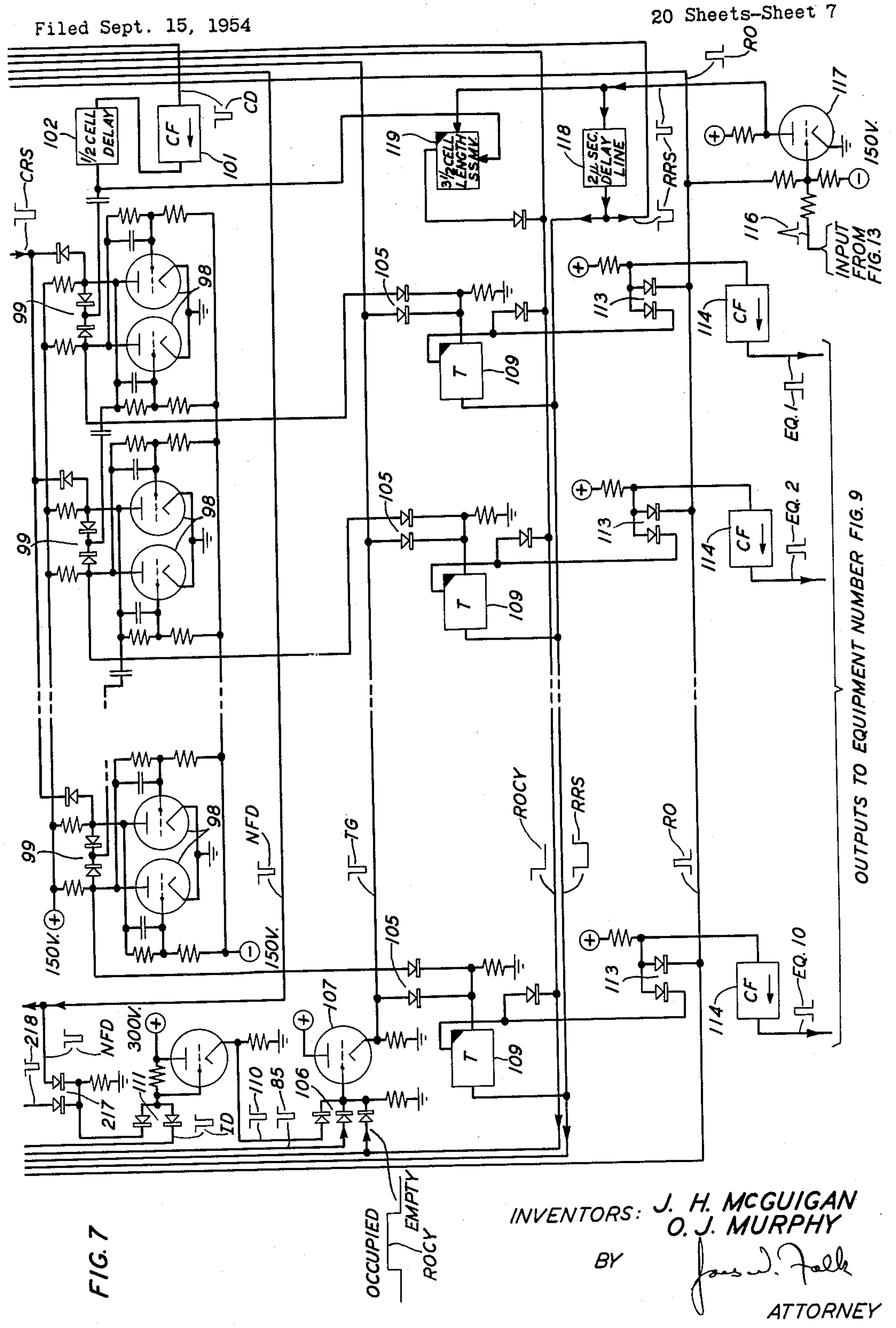
Figure 8:
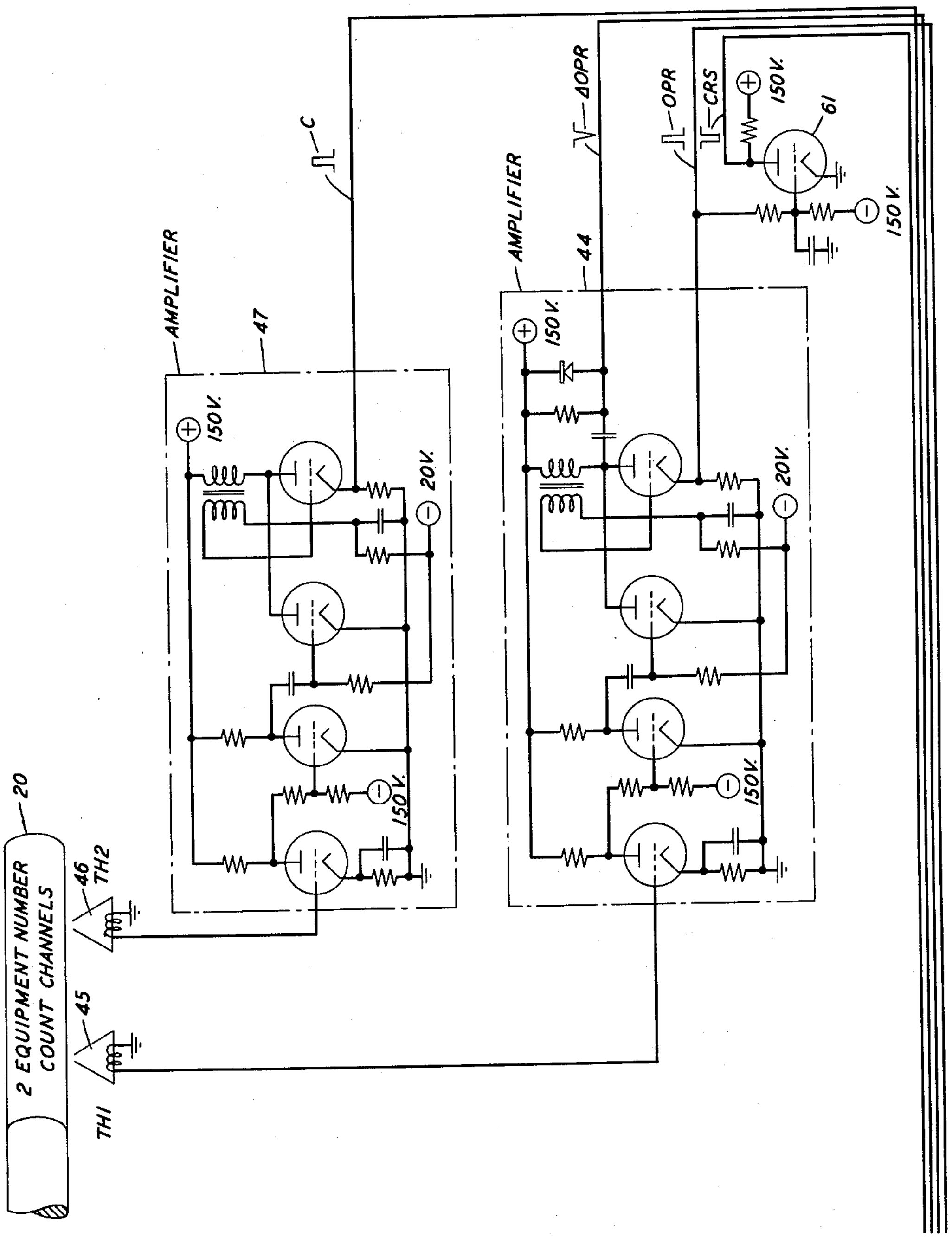

As described above, a pulse 116 is applied for the register drum circuits to an inverter 117, seen in Fig. 7, whenever any information has been written in the digit storage channels on the register drum to cause the resetting of the line drum toggle registers 33 and 109. This pulse 116 is derived from a cathode follower circuit 203, seen in Fig. 13, the cathode of which is connected to each of the line drum circuits of the ten individual line drums of this specific embodiment of the invention. The grid of cathode follower 203 is connected to a bus 204 which receives a pulse, through a capacitor 205 and diode 206, whenever a mark is written in any of the digit storage channels.

The circuit remains in this condition until the subscriber hangs up and the connection is to be taken down. The fact that a hang-up has occurred is determined by a timing circuit, which may be of the type described in the above-mentioned Malthaner application; in this embodiment the timing circuit includes two hang-up timing channels on each line drum, as seen in Fig. 4. A train of timing enabling pulses 205 is applied to the cathodes of the "write" amplifier tubes of the writing circuits of the hang-up channel writing amplifiers for exactly one revolution of the line drum approximately once every second. This pulse train, which is similar to the CD/ID pulse train, described above with respect to the interdigital timing circuits, is derived from the C pulse through a circuit, seen in Fig. 5, including a half-revolution-period single shot multivibrator 206, driven by the once per revolution OPR pulse and which, in turn, synchronizes a one-second period free-running multivibrator 207, a pair of toggle circuits 208, a pair of triodes 209, a cathode follower 210, and a tetrode 211. The purpose of this circuitry is to generate a pulse lasting exactly one drum revolution approximately once per second and to use this pulse to control the transmission of CD pulses for the use of the hang-up channels. It is to be noted that pulse OPR is fed to left-hand input of toggle T1, 208, and is also used to trigger delay multivibrator 206 so that relatively imprecise timing of the one second multivibrator will never result in input to right-hand side of T1 at same time as input to left-hand side.

The occurrence of a hang-up is recognized by the scanner 26 and the control channels on the line drum, causing gate 49 to deliver the pulse 77, seen in Fig. 3. This pulse causes a first hang-up mark to be written in the HU1 channel, Fig. 4, if pulse 205 is present. If, within one second after writing HU1, gate 50, in Fig. 3, is enabled, it is assumed that the pulse 77 was not due to a hang-up condition but to a dial pulse or other momentary disturbance and a pulse 213 is applied from the gate 50 to the erase gates of the writing amplifier of the HU1 channel, Fig. 4. If this does not occur, however, then one second after the HU1 mark was written, a mark is written in the second hang-up channel HU2 under control of gate 214, Fig. 4, whose inputs are the pulse 77 and a signal that a mark is present in the HU1 channel. The output of the HU2 channel is a hang-up pulse 218 which is applied to three negative AND gates 215, 216, Fig. 4, and 217, Fig. 7. Considering gate 215 first, the inputs of this gate are the register occupied pulse ROCY, a not-first-digit pulse NFD indicating that at least one digit has been registered, and a synchronizing pulse 85 as well as the hang-up pulse 218. The output of AND gate 215 is applied to a toggle circuit 221 and thence, through an AND gate 222 and a cathode follower 223 to the hang-up OR gate of the selector gate circuit 21, Fig. 9. The other input of the AND gate 222 is the read out pulse R0 from the selector circuit 38, seen in Fig. 10.

We shall consider first what happens when the hang-up pulse 225 from the cathode follower 223 is applied to the register drum circuitry. The positive hang-up pulse 225 is applied to an inverter circuit 227, seen in Fig. 17, and a negative hang-up pulse 26 is applied to a toggle register 228 through an AND gate 229, Fig. 17, the other control for which is connected to the display register gate bus 190. Toggle register 228 operates a neon lamp 230 which, in this embodiment, visually advises the operator that hang-up has occurred and thus that a disconnection is to be made.

The hang-up pulse 226 is also applied to a negative AND gate 232, Fig. 18, the other input of which is pulse 154, derived from circuitry on Fig. 17 and described above, which indicates that a match has been found and that a digit has been registered in the storage channels on the drum. The transfer of the equipment number pulses EQ to the register drum circuitry in hang-up is described below. The output of gate 232 is applied to two other negative AND gates 233 and 234. Gate 234 is for the case of a hang-up before completion of the dialing and thus before the operator has set up a connection; as its functioning is simpler let us consider it first. The inputs to gate 234 are the output pulse from gate 232 and the pulse 186 indicating that no information has been displayed by the display registers. Enablement of gate 234 causes a pulse to be transmitted through a cathode follower 236 and a negative OR circuit 237 to an inverter 238 and an erase register drum bus 240. Bus 240 is connected to the erase gates of the writing amplifiers of all the register drum channels. Thus whenever a hang-up occurs before a subscriber has finished dialing a called number, the information written in the register channels is erased.

If, however, the subscriber had finished dialing and the operator had set up a connection, then the output of gate 232 is applied as one input of gate 233 the other inputs of which are the pulse 182, indicating that the display register toggles are unoccupied, and a pulse 242 which is the inverse of pulse 186. Pulse 242 is present when information had priorly been displayed on the toggles, as indicated by a mark in the information displayed channels, whereas pulse 186 indicates that no information had priorly been displayed by the toggles. The output of gate 233 is connected to a cathode follower 243, the cathode of which is connected to the OR circuit 237 and thus causes generation of an erase pulse on the erase register drum bus 240, as just described. However, the cathode of cathode follower 243 is also connected through a negative AND gate 245 and cathode follower 246 to the OR gate 189. Thus enablement of gate 233 also causes a pulse to be placed on the display register gate bus 190 thereby causing the information designating the connection that had previously been set up to be displayed by the neon lamps 133, 145, and 167, which, together with lamp 230, advise the operator the connection to be torn down. The other input to gate 245 is the synchronizing pulse 184.

Accordingly we have described the display of the information to advise the operator that the connection should be taken down and the erasure of the information on the register drum channels pertinent to that call.

Turning back to Fig. 4, as described above, the enablement of gate 215 causes the hang-up pulse 225 to be transmitted from the line drum circuitry through the selector gate circuit 21 to the register drum circuitry to attain the operations just described above. Enablement of gate 215, however, also applies a pulse through an OR gate 250 and a pulse stretching half-cell length single shot multivibrator 251 to the cathode follower 252. The cathode of cathode follower 252 is connected to an erase-because-of-hang-up bus 253. Bus 253 is connected to the erase gates of the writing amplifiers of the hang-up timer channels. The erase pulse WOH on bus 253 is also applied to the OR gate 119, on Fig. 3, to cause erasure of information in the latest digit channels; the WOH pulse also causes erasure in the not-first-digit and in the control channel writing amplifier circuits.

Another input to OR gate 250, Fig. 4, is from AND gate 216 the inputs of which are the hang-up pulse 218, a synchronizing pulse 85, and a pulse 256 which is an inverted not-first-digit pulse NFD. Thus gate 216 is disabled when a not-first-digit pulse is present. Accordingly gate 216 is concerned with erasure of information on the line drum because of hang-up before dialing of the first digit.

As mentioned above, the hang-up pulse 218 is also applied to a negative AND gate 217, Fig. 7, through which if a not-first-digit pulse NFD is present, it is transmitted to the OR gate 111 to cause a toggle gate pulse TG to be applied to the gates of the register toggles of the line drum circuitry, as described above. This enables the equipment number of this line to be transmitted to the register drum circuitry for location of the proper slot on the register drum in which the information is to be erased, as described above. When the proper match is found, by the match circuit 147A and 147B, as described above and seen on Figs. 19 and 17, the pulse 154 indicating the match and that a digit had been stored, is applied as the other control input to the AND gate 232, Fig. 18, together with the inverted hang-up pulse 226, which causes operation of the hang-up circuits in the register drum circuitry as described just above.

Various of the circuit elements depicted as blocks in the drawing are shown schematically in Figs. 20 to 24. Figs. 20A and 20B show the block and schematic diagram form of a single shot multivibrator, the shading in the corner indicating which side is normally conducting. Figs. 21A and 21B show the block and schematic diagram form of a cathode follower circuit, Figs. 22A and 22B show the block and schematic diagram form of a toggle circuit, Figs. 23A and 23B show the block and schematic diagram form of the reading and writing amplifiers, and Figs. 24A and 24B show the block and schematic diagram form of an inverter, all employable in this specific illustrative embodiment of this invention. The reading and writing amplifiers may advantageously be of the type disclosed in Patent 2,700,148, issued January 18, 1955, of J. H. McGuigan, O. J. Murphy, and N. D. Newby.

It is to be understood that the above-described arrangements are illustrative of the application of the principles of the invention. Numerous other arrangements may be devised by those skilled in the art without departing from the spirit and scope of the invention.

What is claimed is:

1. In a telephone switching system, a plurality of subscriber lines, means for scanning each of said lines in succession, and means for registering dial pulses corresponding to dialed digits originating on any of said lines, said pulses being detected by said scanning means, said registering means including a rotating surface of a magnetizable material, each of said lines being assigned a portion of said surface, means for counting the dial pulses of the first digit dialed and registering in a first group of cells in the portion assigned to the line from which said pulses originate coded information corresponding to the decimal count of said dial pulses as said pulses are counted, timing means for recognizing the end of a train of regularly spaced dial pulses, and means for transferring the coded information corresponding to the final decimal count of said first digit dialed to a second group of cells, thereby returning the first group to their original condition, the second dialed digit being counted and the corresponding coded information being registered in said first group of cells as said second digit is counted.

2. In a telephone switching system, a plurality of subscriber lines, means for scanning each of said lines in succession, and means for registering dial pulses corresponding to dialed digits originating on any of said lines, said pulses being detected by said scanning means, said registering means including magnetic drum means having a surface of a magnetizable material, each of said lines being assigned a slot on said surface, means for counting the dial pulses of the first digit dialed and changing the magnetic condition of a first group of cells in the slot assigned to the line from which said pulses originate, the magnetic condition of said cells being changed in accordance with a code corresponding to the decimal count of said dial pulses priorly counted, means for transferring the coded information corresponding to the final decimal count of said first digit dialed to a specific second group of cells, and means for erasing said coded information priorly registered in said first group of cells, the second dialed digit being counted by said counting means and the code corresponding to the decimal count of each of said second dial pulses being registered in said first group of cells as counted.

3. In a telephone switching system in accordance with claim 2, means for transferring the coded information corresponding to the final decimal count of said second dialed digit to a specific third group of cells.

4. In a telephone switching system in accordance with claim 3, a third dialed digit being counted by said counting means and the code corresponding to the decimal count of each of said third dial pulses being registered in said first group of cells as counted.

5. In a telephone switching system, a plurality of subscriber lines, means for scanning each of said lines in succession, and means for registering dial pulses corresponding to dialed digits originating on any of said lines, said pulses being detected by said scanning means, said registering means including a first magnetic drum, each of said lines being assigned an area on the surface of said first drum, means for counting the dial pulses of the first digit dialed and writing in a group of cells in the area assigned to the line from which said pulses originate coded information corresponding to the decimal count of said dial pulses as said pulses are counted, a second magnetic drum, said second magnetic drum having a plurality of groups of dial digit storage channels thereon, and means for transferring the coded information corresponding to the final count of said first digit dialed to a particular one of said groups of storage channels and to a specified part of the area of these channels on said second drum, the second dialed digit being counted and the corresponding coded information being written in said group of cells of said first drum as said second digit is counted.

6. In a telephone system in accordance with claim 5, means for transferring the coded information corresponding to the final count of said second digit dialed to a second particular one of said groups of storage channels and to that portion of the area of said second group of channels corresponding to the portion of the area in the first group of channels used for the storage of the first dialed digit on said second drum.

7. In a telephone system in accordance with claim 6, each successive dialed digit being counted and the corresponding information written in said group of cells on said first drum as each successive digit is counted, and means for transferring the coded information corresponding to the final count of each of said successive digits to corresponding areas in different particular ones of said groups of storage channels on said second drum.

8. In a telephone switching system, a plurality of line magnetic drums, a plurality of subscriber lines for each of said line drums, scanning means connected to each of said line drums for scanning in succession the subscriber lines of that drum, means individual to each line drum for counting the dial pulses of the first digit dialed by a subscriber and writing in a group of channels on the line drum coded information corresponding to the decimal count of said dial pulses as said pulses are counted, a register magnetic drum, said register drum having a plurality of groups of dial digit storage channels thereon, means for transferring the coded information in said group of channels on any of said line drums and corresponding to the final count of said first digit dialed to a preassigned area of the first digit storage channels on said register drum, and means for erasing the coded information in said group of channels on said line drum corresponding to the decimal count of said first dialed digit after transfer of said information, the second dialed digit being counted and the corresponding coded information being written in said group of channels on said line drum.

9. In a telephone switching system in accordance with claim 8, means for transferring the coded information corresponding to the final count of said second digit dialed and registered in said group of channels on said line drum to an area second digit storage channels on said register drum, corresponding to that used to store the first digit from that particular line drum, each successive dialed digit being counted in said group of channels on said line drum and the coded information corresponding to the final count of each successive digit being transferred to the corresponding area of successive digit storage channels on said register drum.

No references cited.